US012527400B2

(12) United States Patent
Richardson

(10) Patent No.: US 12,527,400 B2
(45) Date of Patent: Jan. 20, 2026

(54) TATTOO SUPPORT APPARATUS, HEADRESTS, AND FOOTRESTS

(71) Applicant: InkBed, Inc., Mukilteo, WA (US)

(72) Inventor: Kevin Richardson, Everett, WA (US)

(73) Assignee: InkBed, Inc., Mukilteo, WA (US)

( * ) Notice: Subject to any disclaimer, the term of this patent is extended or adjusted under 35 U.S.C. 154(b) by 211 days.

(21) Appl. No.: 18/363,601

(22) Filed: Aug. 1, 2023

(65) Prior Publication Data

US 2024/0032692 A1 Feb. 1, 2024

Related U.S. Application Data

(60) Provisional application No. 63/394,061, filed on Aug. 1, 2022.

(51) Int. Cl.

| | |
|---|---|
| ***A47C 1/024*** | (2006.01) |
| ***A47C 7/38*** | (2006.01) |
| ***A47C 7/50*** | (2006.01) |
| ***A61G 13/12*** | (2006.01) |

(52) U.S. Cl.

CPC ................ *A47C 1/024* (2013.01); *A47C 7/38* (2013.01); *A47C 7/383* (2013.01); *A47C 7/5066* (2018.08); *A61G 13/121* (2013.01)

(58) Field of Classification Search

CPC ........... A47C 7/38; A47C 7/383; A47C 9/005; A47C 1/024; A47C 1/14; A47C 7/5066; A61G 13/121

USPC ...................... 297/900; 5/621, 622, 623, 624

See application file for complete search history.

(56) References Cited

U.S. PATENT DOCUMENTS

| | | | |
|---|---|---|---|
| 717,026 | A | 12/1902 | Ostendorf |
| 1,420,924 | A | 6/1922 | Hogan |
| 1,699,894 | A | 1/1929 | Klemm |
| 1,867,600 | A | 7/1932 | Schwarzkopf |
| 1,941,340 | A | 12/1933 | Louis |
| 2,364,050 | A | 12/1944 | Benson |

(Continued)

FOREIGN PATENT DOCUMENTS

| | | | |
|---|---|---|---|
| CA | 2953773 A1 * | 6/2018 | ............. A47C 7/029 |
| CN | 2151738 Y | 1/1994 | |

(Continued)

OTHER PUBLICATIONS

"Hydraulic All Purpose Tattoo Chair KI New York", htt1;r//vvwvv. puretat.co1:1, accessed Jan. 18, 2010, 2 pages.

(Continued)

*Primary Examiner* — Rodney B White

(74) *Attorney, Agent, or Firm* — Perkins Coie LLP

(57) ABSTRACT

A supporting apparatus that can support a user, such as a client receiving a tattoo or a tattoo artist applying a tattoo, is disclosed herein. The supporting apparatus can support the user in a variety of different configurations such that a tattoo artist can comfortably apply a tattoo on the skin of a client, and the client can comfortably receive the tattoo. In some embodiments, the supporting apparatus can be reconfigured between a chair configuration and a bed configuration. In some embodiments, a headrest of the supporting apparatus can be reconfigured between a head supporting configuration and a chin supporting configuration. In some embodiments, a footrest of the supporting apparatus can be reconfigured between a raised configuration and a lowered configuration.

33 Claims, 14 Drawing Sheets

(56) References Cited

U.S. PATENT DOCUMENTS

| | | | | |
|---|---|---|---|---|
| 2,687,765 | A | 8/1954 | Constance | |
| 2,919,746 | A | 1/1960 | Nellie | |
| 3,058,778 | A | 10/1962 | Campbell | |
| 3,145,053 | A | 8/1964 | Thompson | |
| 3,188,136 | A | 6/1965 | Redfield et al. | |
| 3,220,771 | A | 11/1965 | Doss | |
| 3,227,440 | A | 1/1966 | Scott | |
| 3,319,747 | A | 5/1967 | Lauper | |
| 3,649,074 | A | 3/1972 | Mcdonald et al. | |
| 3,679,257 | A | 7/1972 | Jacuzzi | |
| 3,810,673 | A | 5/1974 | Shoji | |
| 3,897,102 | A | 7/1975 | Lemaire | |
| 4,159,145 | A | 6/1979 | Quakenbush | |
| 4,170,800 | A | 10/1979 | Wiberg | |
| 4,285,541 | A | 8/1981 | Onishi | |
| 4,387,888 | A | 6/1983 | Marinakis | |
| 4,516,805 | A | 5/1985 | Leeper et al. | |
| 4,650,249 | A | 3/1987 | Serber | |
| 4,660,549 | A | 4/1987 | Kowalski | |
| 4,699,423 | A * | 10/1987 | Fitzig | A61B 90/60 297/215.14 |
| 4,795,214 | A | 1/1989 | Holdt | |
| 4,805,928 | A | 2/1989 | Nakao et al. | |
| 4,832,407 | A | 5/1989 | Serber | |
| 4,943,117 | A * | 7/1990 | Brown | A47C 9/005 297/411.2 X |
| 5,060,327 | A | 10/1991 | Celestina et al. | |
| 5,086,769 | A | 2/1992 | Vianello et al. | |
| 5,098,158 | A | 3/1992 | Palarski | |
| 5,209,509 | A | 5/1993 | Gay et al. | |
| 5,232,426 | A | 8/1993 | Van | |
| 5,315,722 | A | 5/1994 | Djie | |
| 5,350,346 | A | 9/1994 | Martinez | |
| D352,635 | S | 11/1994 | Yoder | |
| 5,401,078 | A | 3/1995 | Riach et al. | |
| 5,487,590 | A | 1/1996 | Haynes | |
| 5,538,011 | A | 7/1996 | Craft et al. | |
| 5,642,542 | A | 7/1997 | Kometani | |
| 5,645,079 | A * | 7/1997 | Zahiri | A61F 5/3769 5/624 |
| 5,645,313 | A | 7/1997 | Best et al. | |
| 5,653,499 | A | 8/1997 | Goodall | |
| 5,678,894 | A | 10/1997 | Eley | |
| 5,762,402 | A | 6/1998 | Gillotti | |
| 5,875,779 | A | 3/1999 | Fuhrman et al. | |
| 5,921,696 | A * | 7/1999 | Gillotti | A61G 15/007 24/270 |
| 5,926,871 | A | 7/1999 | Howard | |
| 5,967,610 | A | 10/1999 | Lin | |
| 5,971,475 | A | 10/1999 | Lawson et al. | |
| 5,971,485 | A | 10/1999 | Clark | |
| 6,010,192 | A | 1/2000 | King | |
| 6,012,184 | A | 1/2000 | Childers | |
| 6,065,808 | A * | 5/2000 | Tinsley | A61G 15/007 297/195.11 |
| 6,089,593 | A | 7/2000 | Hanson et al. | |
| 6,135,548 | A | 10/2000 | McGuire | |
| 6,151,734 | A * | 11/2000 | Lawrie | A47C 20/026 5/643 |
| 6,212,713 | B1 | 4/2001 | Kuck et al. | |
| 6,251,123 | B1 * | 6/2001 | Patner | A47C 7/54 297/411.2 X |
| 6,282,738 | B1 * | 9/2001 | Heimbrock | A61G 7/0507 5/613 |
| 6,299,254 | B1 | 10/2001 | Dinh et al. | |
| 6,315,319 | B1 | 11/2001 | Hanson et al. | |
| 6,336,235 | B1 | 1/2002 | Ruehl | |
| 6,446,287 | B2 | 9/2002 | Borders | |
| 6,543,853 | B1 | 4/2003 | Splane, Jr. | |
| 6,619,747 | B2 * | 9/2003 | Ko | A47C 9/025 297/411.31 |
| 6,698,431 | B1 | 3/2004 | Harris et al. | |
| 6,698,830 | B1 | 3/2004 | Gaines | |
| 6,767,066 | B1 | 7/2004 | Tornero | |
| 6,769,736 | B2 * | 8/2004 | Roleder | A47C 9/005 297/195.11 |
| 6,805,409 | B2 | 10/2004 | Parker | |
| 6,824,219 | B2 | 11/2004 | Ruckstadter | |
| 6,846,042 | B2 | 1/2005 | Hanson et al. | |
| 6,851,755 | B2 | 2/2005 | Dinkel | |
| 6,854,807 | B2 | 2/2005 | D'Alessandro | |
| 6,918,143 | B2 | 7/2005 | Wiberg | |
| 7,021,037 | B1 | 4/2006 | Szymas | |
| 7,024,711 | B1 * | 4/2006 | Stasney | A61B 8/40 5/601 |
| 7,080,885 | B2 | 7/2006 | Bain | |
| 7,090,303 | B2 * | 8/2006 | Kropa | A47C 9/002 297/423.22 |
| 7,134,721 | B2 | 11/2006 | Robinson | |
| 7,234,768 | B2 | 6/2007 | Manning et al. | |
| 7,293,834 | B2 | 11/2007 | Riach et al. | |
| 7,357,456 | B1 | 4/2008 | Freer et al. | |
| 7,431,396 | B1 | 10/2008 | Dasso | |
| 7,600,817 | B2 | 10/2009 | Kramer et al. | |
| 7,618,090 | B2 | 11/2009 | Grenon | |
| 7,628,455 | B2 | 12/2009 | Brodeur | |
| 7,770,976 | B2 | 8/2010 | Lee | |
| 7,784,871 | B2 | 8/2010 | Cochran et al. | |
| 7,963,592 | B1 | 6/2011 | Stanley | |
| 8,095,204 | B2 * | 1/2012 | Smith | A61B 5/704 5/601 |
| 8,332,977 | B2 * | 12/2012 | Bochner | A61G 13/129 5/624 X |
| 8,464,720 | B1 * | 6/2013 | Pigazzi | A61B 5/704 |
| 8,511,314 | B2 * | 8/2013 | Pigazzi | A61G 13/10 |
| 8,651,569 | B2 | 2/2014 | Andoloro | |
| 8,702,162 | B2 * | 4/2014 | Isaacson | A47C 3/029 297/195.11 |
| 9,084,486 | B1 | 7/2015 | Richardson et al. | |
| 9,161,819 | B2 * | 10/2015 | Magelund | A61B 90/60 |
| 9,233,041 | B2 * | 1/2016 | Lheoma | A61G 13/08 |
| 9,375,088 | B2 | 6/2016 | Andoloro | |
| 9,375,343 | B2 * | 6/2016 | Marshall | A61G 13/1225 |
| 9,398,993 | B2 * | 7/2016 | Wei | A47C 7/383 |
| 9,451,831 | B2 | 9/2016 | Richardson et al. | |
| 9,498,398 | B1 | 11/2016 | Ehrenleitner | |
| 9,549,865 | B2 * | 1/2017 | Hiebert | A61G 13/1255 |
| 9,814,313 | B2 | 11/2017 | Richardson et al. | |
| 9,853,438 | B2 | 12/2017 | Chae et al. | |
| 9,877,588 | B2 * | 1/2018 | Belleh | A47C 7/38 |
| 9,913,541 | B2 * | 3/2018 | Arnett | A47C 9/005 |
| 10,238,213 | B2 | 3/2019 | Richardson et al. | |
| 10,264,885 | B2 | 4/2019 | Andoloro | |
| 10,383,444 | B1 | 8/2019 | Parkins | |
| 10,506,881 | B2 | 12/2019 | Richardson et al. | |
| 10,524,573 | B2 | 1/2020 | Richardson et al. | |
| 10,638,843 | B2 | 5/2020 | Andoloro | |
| 10,857,052 | B1 | 12/2020 | Grismer | |
| 10,918,213 | B2 * | 2/2021 | Fryer | A47C 9/002 |
| 10,959,523 | B2 | 3/2021 | Richardson et al. | |
| 10,973,332 | B2 | 4/2021 | Richardson | |
| 11,051,906 | B2 * | 7/2021 | Nardo | A61B 90/60 |
| 11,234,526 | B1 | 2/2022 | Levin | |
| 11,246,418 | B2 | 2/2022 | Andoloro | |
| 11,503,917 | B2 * | 11/2022 | Toscano | B64D 11/0644 |
| 11,707,136 | B2 | 7/2023 | Richardson | |
| 11,759,022 | B2 * | 9/2023 | Mace | A47G 9/1009 5/613 |
| 11,850,105 | B2 * | 12/2023 | Bruni | A47C 7/029 |
| 12,083,050 | B1 * | 9/2024 | Akiona | A61G 13/121 |
| 2002/0000008 | A1 | 1/2002 | Borders | |
| 2002/0067060 | A1 | 6/2002 | Lloyd | |
| 2002/0096929 | A1 * | 7/2002 | Showerman | A47C 7/38 297/423.12 |
| 2002/0158492 | A1 | 10/2002 | Ko et al. | |
| 2003/0011221 | A1 | 1/2003 | Yoshie et al. | |
| 2004/0133979 | A1 | 7/2004 | Newkirk et al. | |
| 2006/0202522 | A1 * | 9/2006 | Lee | A47C 7/383 297/61 |
| 2006/0225212 | A1 | 10/2006 | Parson et al. | |
| 2007/0035164 | A1 | 2/2007 | North | |
| 2007/0052275 | A1 | 3/2007 | Ghilzai | |

(56) References Cited

U.S. PATENT DOCUMENTS

| | | | | |
|---|---|---|---|---|
| 2007/0108805 | A1 | 5/2007 | Manning | |
| 2007/0126202 | A1 | 6/2007 | Crosby | |
| 2007/0163049 | A1* | 7/2007 | Brinkerhoff | A61G 13/12 5/637 |
| 2009/0199339 | A1* | 8/2009 | Barr | A61G 13/02 5/613 |
| 2009/0235457 | A1* | 9/2009 | Harvey | A61G 13/0009 5/624 |
| 2009/0250565 | A1 | 10/2009 | Jaggers | |
| 2009/0295213 | A1 | 12/2009 | White | |
| 2010/0127550 | A1 | 5/2010 | Baker et al. | |
| 2010/0295357 | A1 | 11/2010 | Koehler et al. | |
| 2011/0079439 | A1 | 4/2011 | Vail, III | |
| 2011/0127391 | A1* | 6/2011 | McDonald | A47C 7/38 248/118 |
| 2011/0163577 | A1* | 7/2011 | Anastasov | A61B 90/60 297/411.2 X |
| 2011/0272976 | A1 | 11/2011 | Wei et al. | |
| 2012/0047656 | A1* | 3/2012 | Benton | A47C 7/383 5/640 |
| 2013/0038096 | A1 | 2/2013 | Newsome | |
| 2013/0111667 | A1* | 5/2013 | Stern | A61G 13/04 5/604 |
| 2015/0123432 | A1* | 5/2015 | Ray | A61B 90/60 297/188.01 |
| 2015/0257960 | A1 | 9/2015 | Reyes | |
| 2015/0305508 | A1 | 10/2015 | Richardson et al. | |
| 2019/0343291 | A1* | 11/2019 | Avegno | A47C 1/0342 |
| 2020/0353991 | A1 | 11/2020 | Sakai | |
| 2022/0183918 | A1* | 6/2022 | Behrendt | A47C 7/383 |
| 2022/0202185 | A1 | 6/2022 | Andoloro | |
| 2022/0296449 | A1* | 9/2022 | Martin | B01D 39/1623 |
| 2024/0049887 | A1* | 2/2024 | Mace | A47G 9/1009 |

FOREIGN PATENT DOCUMENTS

| | | | | |
|---|---|---|---|---|
| CN | 300792112 | S | 6/2008 | |
| CN | 201119969 | Y | 9/2008 | |
| KR | 2009085169 | A * | 8/2009 | A47C 7/405 |
| KR | 20140100185 | A * | 8/2014 | A47C 7/54 |
| WO | 2009056004 | A1 | 5/2009 | |
| WO | 2011087232 | A2 | 7/2011 | |
| WO | 2013078569 | A1 | 6/2013 | |
| WO | WO-2016178456 | A1 * | 11/2016 | A47C 7/62 |
| WO | 2019161124 | A1 | 8/2019 | |

OTHER PUBLICATIONS

"Tatsoul 370" httb)://ww'N.tatsouLcc:ni, accessed Feb. 2, 2010, 7 pages.

"Tattoo-Chairs-table", http://vvww tattoochair.corn, © 2009, accessed Jan. 18, 2010, 7 pages.

"Traveler—The Ultimate Table", http://www.tattooabie.co;T1, Fab Tech, accessed Jan. 18, 2010, 3 pages.

Extended European Search Report mailed Jul. 6, 2017 in European Patent Application No. 15735366.5, 7 pages.

International Search Report and Written Opinion mailed Nov. 27, 2008 in International Patent Application No. PCT/CN2008/001636, 6 pages.

International Search Report and Written Opinion mailed May 11, 2015 in International Patent Application No. PCT/US15/10910, 14 pages.

International Search Report and Written Opinion mailed Dec. 11, 2023 in International Patent Application No. PCT/US23/29237, 20 pages.

International Search Report and Written Opinion mailed Dec. 20, 2024 in International Patent Application No. PCT/US24/40637, 21 pages.

* cited by examiner

TATTOO SUPPORT APPARATUS, HEADRESTS, AND FOOTRESTS

CROSS-REFERENCE TO RELATED APPLICATION

The present application claims the benefit of U.S. Provisional Patent Application No. 63/394,061, filed Aug. 1, 2022, the disclosure of which is incorporated herein by reference in its entirety.

TECHNICAL FIELD

The present technology is related to a support apparatus and associated methods of using same. In particular, the present technology is related to a reconfigurable support apparatus for a user obtaining a tattoo and a user applying a tattoo.

BACKGROUND

The popularity of tattoos has increased and inspired refinement in tattoo equipment and the sophistication of tattoos themselves. A typical tattoo studio has a variety of tools to apply tattoos to clients. For example, a tattoo artist may have a tattoo chair, a table, an arm stand, a footrest, etc. All of these pieces of furniture take up space, yet may be required in order to properly apply tattoos.

The furniture used by tattoo artists is often not specifically designed to be used to apply tattoos, but rather, are used for other applications, such as medical or beauty salon applications. Thus, prolonged use of the furniture for tattooing may be uncomfortable for both the tattoo artist and the client. For example, many tattoo artists use massage tables to apply tattoos to a client's back, shoulders, or legs. Because massage tables are not designed for the ergonomic needs of a tattoo artist, they may cause discomfort or health problems for the artist.

Moreover, commonly used furniture in tattooing may not be able to place the client in a position that naturally stretches the area of the skin that is going to receive the tattoo. In order to receive a high-quality tattoo, the skin needs to be stretched; otherwise, the tattoo may be applied incorrectly (e.g., the tattoo may be disfigured). In order to compensate, a tattoo artist typically manually stretches and holds the client's skin while the tattoo is applied. This is uncomfortable for the tattoo artist, the client, or both. Additionally, the artist may not stretch the skin in a way that it would naturally stretch, resulting in distortion of the tattoo. Accordingly, there is a need for an apparatus that can be used to comfortably position a client for tattooing.

SUMMARY

An exemplary embodiment is a support apparatus for supporting a user, such as a client receiving a tattoo or a tattoo artist applying a tattoo on a client. The support apparatus can rest upon a support surface (e.g., a floor) and can be configured to ergonomically support a user's upper body, including the user's chest, arms, chin, or other body parts, to help prevent, reduce, or limit muscle fatigue (e.g., muscle fatigue in the user's arms, shoulders, back, etc.), discomfort, and/or pain. The apparatus can be configured such that a client can be placed in an ergonomic position, for example, a position that is comfortable for the client, the tattoo artist, or both. For example, the apparatus can be reconfigurable to adjust between different positions, such as a bed position (e.g., a horizontal arrangement), a chair position (e.g., an arrangement for supporting the client in a sitting position by articulating certain sections of the apparatus relative to the floor), a straddling configuration (e.g., an artist or client can straddle the apparatus), or other positions.

In some embodiments, during a tattoo session, the tattoo artist can move sections of the apparatus to desired locations to facilitate applying the tattoo. For example, a headrest can be reconfigured between a head support configuration and a chin support configuration. In another example, a footrest can be reconfigured between different heights. In some embodiments, the support apparatus can be manually reconfigured by, for example, operating one or more locking mechanisms, manually rotating components (e.g., arm rests, sections of the chest support, etc.), or the like. In some embodiments, the support apparatus can be motorized. For example, headrests, footrests, chest supports, armrests, and other features can be motorized to automatically position components at desired positions using a controller. In some embodiments, the support apparatus can be both manually and automatically reconfigurable. For example, a user can manually set parts to desired positions. The user can also reconfigure the support apparatus automatically based on preset configurations defined, for example, by the user, the manufacturer, or the like.

In some cases, the user can lean forward against a padded chest support of the support apparatus. The chest support allows unrestricted movement of the user's arms on the front side of the chest support. For example, the user's chest can rest comfortably against the back side of the chest support while the user performs various tasks on the front side. The support apparatus can further include armrests or other support devices for supporting the user's shoulders, arms, or the like. For example, the arm rests can be positioned to support the user's arms while the user rests against the chest support.

In at least one exemplary embodiment, an apparatus can include arm sections, leg sections, a seat section, and a back section, some of which can be coupled to a frame. Each section can comfortably support and articulate different parts of a client's body during a tattoo session. For example, the arm sections can be raised, lowered, or angled in order to place the arms of a client in positions to comfortably support the arms while one or more tattoos are applied.

DETAILED DESCRIPTION OF TECHNOLOGY

Figure 1:
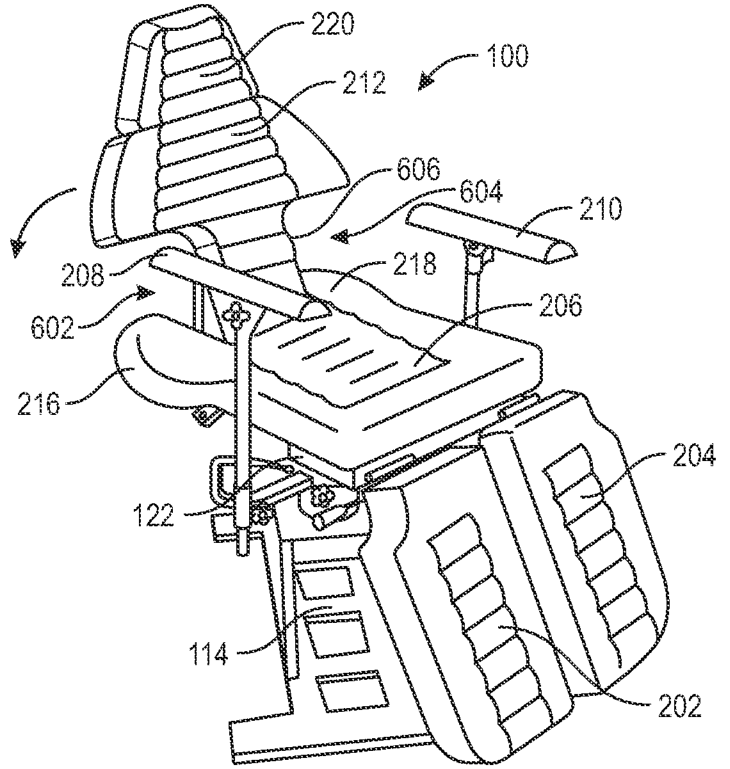
FIG. 1 is an isometric view of a support apparatus in a chair configuration in accordance with embodiments of the present technology.
Figure 2:
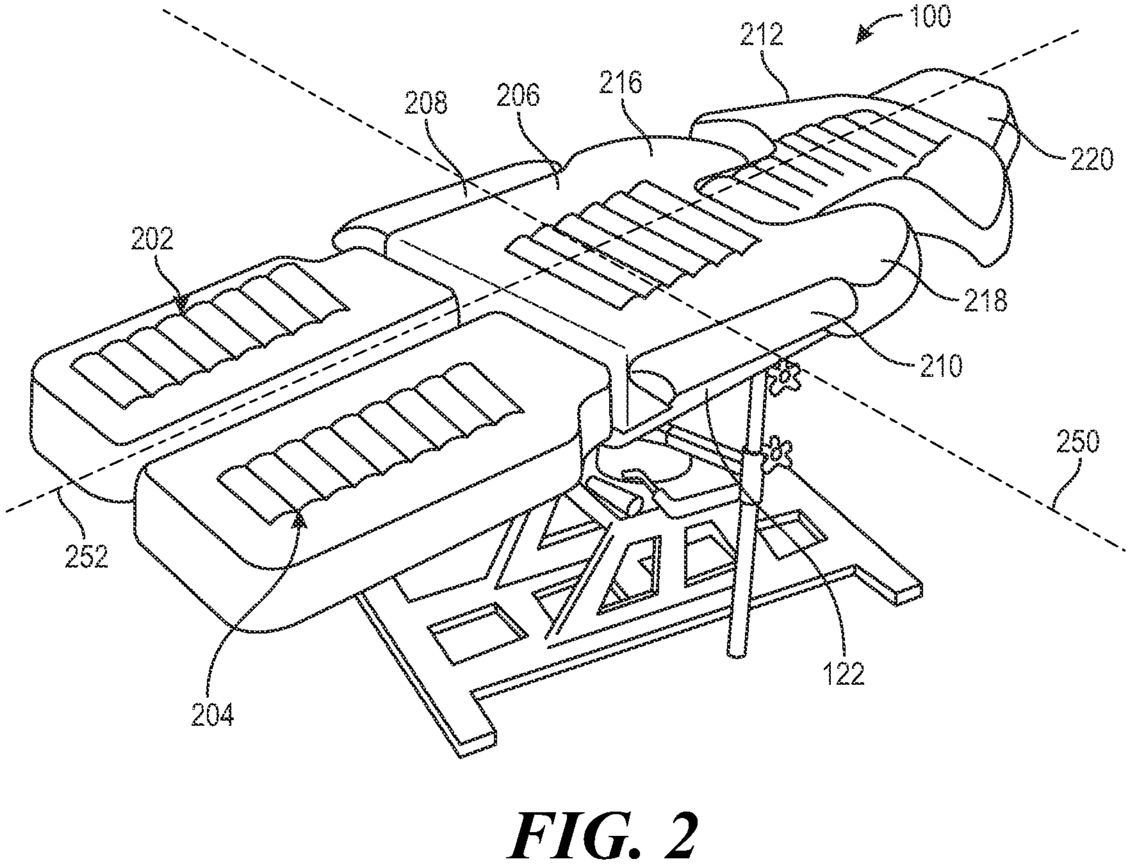
FIG. 2 is an isometric view of the support apparatus of FIG. 1 in a bed configuration.

FIGS. 1 and 2 are isometric views of a chair or support apparatus 100 ("apparatus 100") in a chair configuration and in a bed configuration, respectively, in accordance with embodiments of the present technology. The apparatus 100 can be configured such that a user can be placed in an ergonomic position, for example, a position that is comfortable for the user, the tattoo artist, or both. For example, the apparatus 100 can be reconfigurable to adjust between different positions, such as the chair configuration of FIG. 1 (e.g., an arrangement for supporting the user in a sitting position by articulating certain sections of the apparatus relative to the floor), the bed configuration of FIG. 2 (e.g., a horizontal arrangement), or other configurations (e.g., arranged at an angle between the chair and bed configurations). In some embodiments, the apparatus can be manually moved between different configurations. During a tattoo session, the tattoo artist can move (e.g., manually or robotically) different sections of the apparatus to desired locations to facilitate applying a tattoo. In motorized embodiments, the apparatus can be electrically driven between different configurations using, for example, a controller. The controller can be operated by the user and/or the tattoo artist.

The apparatus 100 can include supporting padded sections, including leg sections 202 and 204, arm sections 208 and 210, seat section 206, back section 212, and headrest 220 flush with seat section 206, together forming a generally flat surface for a user to lie on when in the bed configuration. The back section 212 can be configured to be straddled by the user receiving the tattoo. In exemplary embodiments, the back section 212 can be formed into a variety of shapes in order to support a user's back in the bed and chair configurations, and to allow the user to straddle it. In some embodiments, the back section 212 has a generally cobra-hood-shaped design. In this exemplary embodiment, a proximal portion of the back section 212 (i.e., closer to the seat section 206) can be narrower than a distal portion of the back section 212 (i.e., farther from the seat section 206) in order to define leg openings 602, 604 configured to receive a user's legs when the user is straddling the back section 212. The leg openings 602, 604 can be formed by removing different types of shapes from the back section 212 such as, for example, plano-concave, incurvation-shaped, generally rectangular, generally circular, generally oval, or generally square cuts, or cuts defined by a tapering from the proximal end of the back section 212 to the distal end. In at least one exemplary embodiment, the back section 212 could be generally "T" or "Y" shaped or cobra-hood shaped.

The back section 212 can be rotatably coupled to, for example, a rear portion of the seat section 206. The coupling that attaches the proximal portion of the back section 212 can be used to reconfigure the apparatus 100 from the chair configuration (FIG. 1) to the bed configuration (shown in FIG. 2). For example, a user could rotate the back section 212 from the position illustrated in FIG. 1 to the position illustrated in FIG. 2 by rotating the back section 212 from a position in which the back section 212 is generally perpendicular (e.g., ±5% of perpendicular, ±2% of perpendicular, ±1% of perpendicular, etc.) to the seat section 206 (i.e., generally parallel to the frontal plane) to a position in which the back section 212 is flush with the seat section 206 (i.e., parallel to the transverse plane of FIG. 2).

The back section 212 can also include a bacteria-resistant fabric cushion filled with foam padding or the like. As is described in more detail below, the back section 212 can be operatively coupled to a hinge (not shown) via one or more bolts, screws, pins, buttons, nails, adhesives, etc. In an exemplary embodiment, the hinge can be L-shaped. In another exemplary embodiment, the back section 212 can be coupled to the seat section 206 via a hinge. In this manner, the back section 212 can be supported by the seat section 206.

In this exemplary embodiment, a support frame 122 is generally covered with the various sections 204, 206, 208, 210, 212. In some embodiments, the frame 122 can be integrated into one or more of the sections 204, 206, 208, 210, 212. FIG. 2 shows a first axis 252 parallel to both the midsagittal plane and the transverse plane. The first axis 252 is formed by the midsagittal plane cutting through the apparatus and separates the right from left side. Also shown is a second axis 250 parallel to both the frontal plane and the transverse plane. The second axis 250 is formed by the frontal plane cutting through the apparatus and separates the front from the back.

The seat section 206 can include top and bottom portions separated by a plane generally parallel (e.g., ±5% of parallel, ±2% of parallel, etc.) to the transverse plane, forward and rearward portions separated by a plane parallel to the frontal plane, and left and right portions separated by a plane parallel to the midsagittal plane. The seat section 206 can include a bacteria-resistant fabric cushion filled with foam padding or the like. The bottom of the seat section 206 can be operatively coupled to the frame 122 via one or more bolts, screws, pins, buttons, nails, adhesives, etc.

The leg sections 202 and 204 can also be formed from bacteria-resistant fabric cushions filled with foam padding or the like. As described in more detail below, the leg sections 202 and 204 can be operatively coupled to the forward portion of the seat section 206 and/or to the frame 122. In an exemplary embodiment, the leg sections 202 and 204 can be coupled to rotatable assemblies that can independently rotate the leg sections 202 and 204 about an axis parallel to the second axis 250. The leg sections 202 and 204 can independently rotate from a position generally flush with the seat section 206 (e.g., FIG. 2) to a position generally perpendicular to the transverse plane (e.g., similar to the configuration shown in FIG. 1). In at least one embodiment, the leg sections 202 and 204 can also be rotated about a vertical axis (i.e., parallel to the frontal and midsagittal planes). In an exemplary embodiment, each leg section 202 and 204 can be independently rotated horizontally, vertically, or in other directions. In some embodiments, each leg section 202 and 204 has a one-piece design to provide a generally continuous support surface for the user's leg. The leg sections 202, 204 can be sufficiently long to extend along the user's leg, ankle, and foot. In some embodiments, the leg sections 202, 204 can be configured to couple to extenders or other components. This allows the apparatus 100 to receive additional components for flexibility in configuration.

As shown in FIG. 1, the leg openings 602, 604 can be configured to receive a majority of a user's legs when the user is straddling the back section 212. Leg supports 216, 218 of the seat section 206 can be positioned generally underneath the portions of the back section 212 defining the leg openings 602, 604. This allows the portions of the user's legs positioned immediately under the back section 212 to be supported comfortably by the leg supports 216, 218. The padded section 606 between the leg openings 602, 604 can be sufficiently narrow to allow the user to keep their legs generally parallel.

As shown in FIG. 2, the leg supports 216, 218 can be shaped to be compatible with the leg openings 602, 604 such that the back section 212 can be oriented generally parallel to the seat section 206 when the apparatus 100 is in the bed configuration. In an exemplary embodiment, the leg supports 216 and 218 can have a shape similar to the shape of the leg openings 602, 604 or can be cut out of the back section 212. For example, if the leg openings 602, 604 are square-like, the leg supports 216, 218 can be formed to be square-like. If the leg openings 602, 604 are plano-concave shaped, leg supports 216 and 218 can be formed to be plano-convex shaped. As shown in FIG. 2, the leg supports 216, 218 do not need to completely fill the leg openings 602, 604. The leg supports 216 and 218, for example, may only fill enough of the openings 602, 604 so that a user can lie flat on the apparatus 100 in the bed configuration. One or more footrest can be positioned directly below the ends of the leg supports 216 and 218 and are as discussed in connection with FIGS. 12A-15B.

The apparatus 100 can include motorized components for positioning various components. By way of example, the apparatus 100 can include a chest support assembly and motorized joints coupled to one or more of the various section 202, 204, 206, 208, 210, 212. The motorized joints can include one or more drive motors, solenoids, or other electronic components (e.g., sensors) and can robotically adjust the configuration of the apparatus 100. The apparatus 100 can include a controller that includes one or more memories, processors, processing units, input devices, keypads, switches, remotes, displays, screens, or combinations thereof. The controller can be in communication with components via wired connections, wireless connections, or both. The controller can be in communication with literary components via wired and/or wireless connections. The controller can be used to move (e.g., raise, lower, rotate, etc.), expand/contract, or otherwise alter a component. The apparatus 100 can receive power from an external power source, such as an AC outlet. In other embodiments, the apparatus 100 can have an internal power source, such as one or more batteries (e.g., rechargeable batteries), allowing the apparatus 100 to be used at a wide range of locations that may not have available power outlets. The power source can also used to power accessories, such as lights, tattoo gun, pumps, or the like.

The apparatus 100 can include one or more features, systems, devices, materials, methods, and techniques described in U.S. application Ser. No. 16/865,784, U.S. application Ser. No. 15/727,896, U.S. application Ser. No. 15/004,837, U.S. application Ser. No. 14/164,035, and U.S. application Ser. No. 12/876,953, all of which are hereby incorporated by reference in their entireties. The features, configurations, and common functionalities of the apparatus 100 can be selected based on the tattooing to be performed. Additionally, the apparatus 100 can be part of embodiments and/or include features discussed in connection with FIGS. 3-21. For example, the headrest 220 of FIGS. 1 and 2 can be replaced with, or in the form of, the headrest discussed in connection with FIGS. 6-15B and can include, or be used with, hinges discussed in connection with FIGS. 17-21. By way of another example, the apparatus 100 can include one or more footrests. By way of yet another example, the apparatus 100 can include features (e.g., actuator assemblies, controllers, control module, etc.) discussed in connection with FIGS. 3-5.

Figure 3:
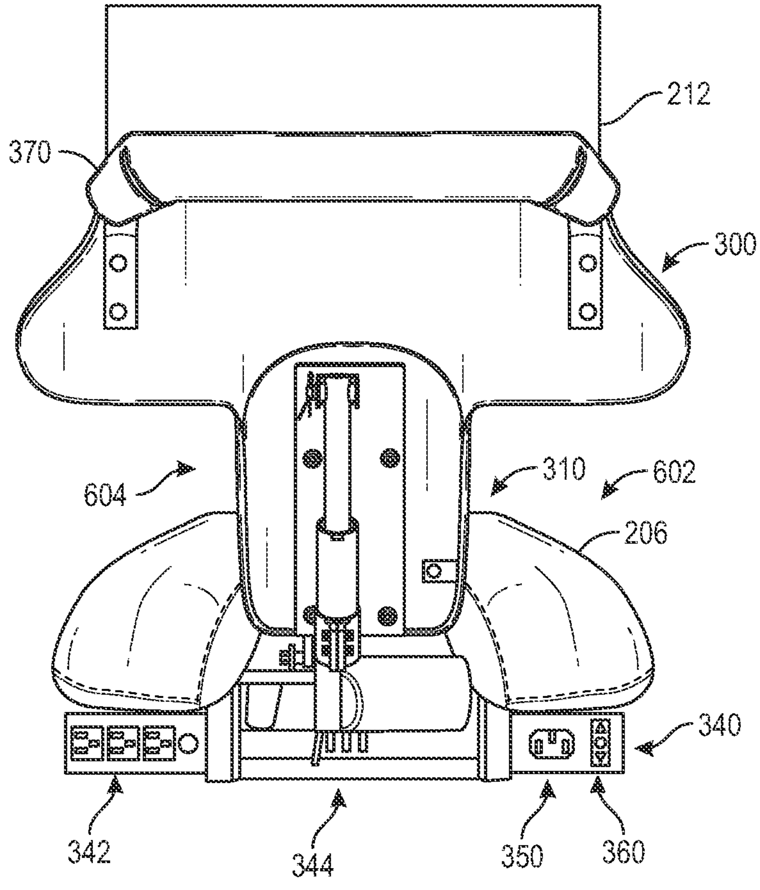
FIG. 3 is an enlarged rear view of a support apparatus with an actuator assembly in accordance with another embodiment of the present technology.
Figure 4:
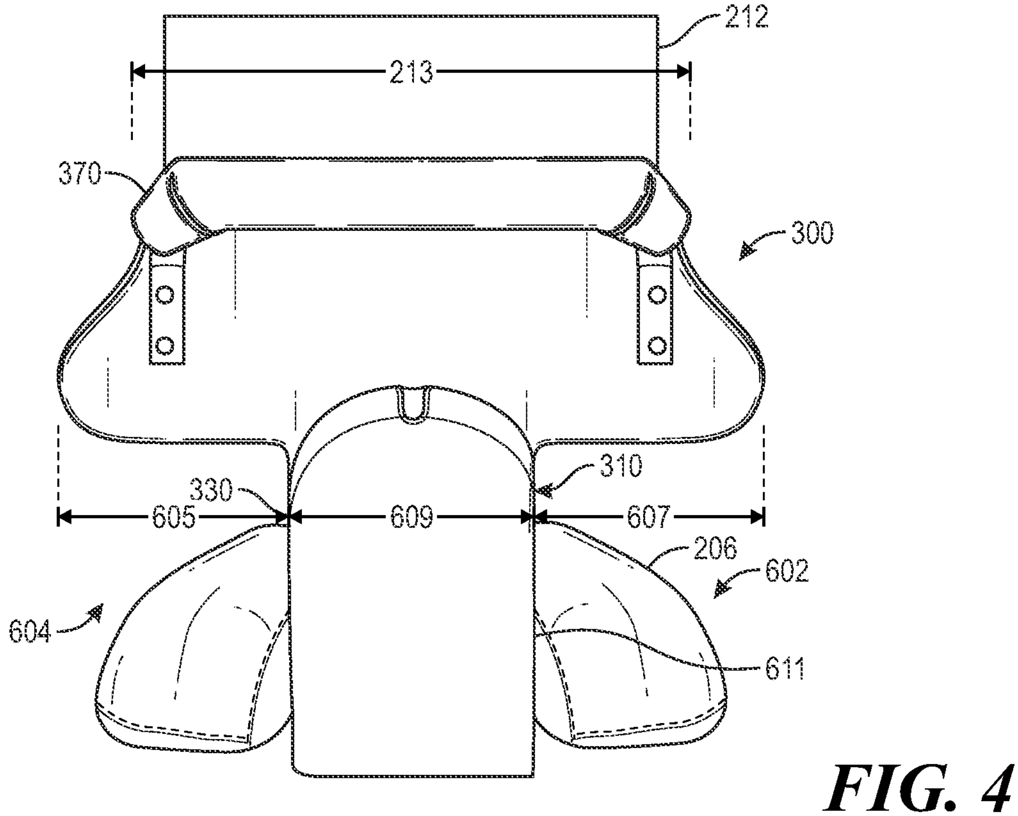
FIG. 4 is an enlarged rear view of the support apparatus of FIG. 3 with an actuator cover.

FIG. 3 is an enlarged rear view of a chair or support apparatus 300 ("apparatus 300") with an actuator assembly 310 in accordance with embodiments of the present technology. FIG. 4 is an enlarged rear view of the apparatus 300 with an actuator cover 330. In the illustrated embodiment of FIG. 3, the actuator assembly 310 is coupled to the back section 212 and the seat section 206. The actuator assembly 310 can be operable to move the back section 212 between configurations (e.g., chair and bed configurations). The actuator assembly 310 can include one or more input devices (e.g., switches, toggles, etc.), one or more pistons (e.g., hydraulic pistons, pneumatic pistons, linear slides), one or more actuators, a controller, a power source (e.g., a rechargeable power source, batteries, etc.), or combinations thereof.

The apparatus 300 can also include a power/control module 340 ("control module 340") operatively connected to the actuator assembly 310. The control module 340 can include a power strip 342, connection 344 with the actuator assembly 310, a power plug 350, and control inputs 360. The power strip 342 can include one or more plugs, ports (e.g., USB port, micro-USB port, etc.), and other electrical components. The number and configuration of the plugs can be selected based on the number of electrical components to be powered via the module 340. The control inputs 360 can include, without limitation, one or more dials, input pads, switches (e.g., illustrated reversing rocker switch), and other components for controlling operation of the actuator assembly 310, the apparatus 300, components powered by the apparatus 300, or the like. In some embodiments, the control module 340 is powered by connecting to an external power supply, such as an AC outlet. In other embodiments, the control module 340 can include one or more power sources, such as rechargeable batteries.

FIG. 4 is an enlarged rear view of components of the apparatus 300 with an actuator cover 330. The actuator cover 330 can cover and protect the actuator assembly 310. The actuator cover 330 can be removed to access internal components of the actuator assembly 310 for maintenance, cleaning, or the like. In some embodiments, the back section 212 includes a handle 370 for conveniently moving the apparatus 300 to different positions or configurations. Additionally, the handle 370 can be positioned above the leg openings 602, 604 to provide a convenient armrest for a user straddling the back section 212. The handle 370 can have a length 213 that is longer than each of the widths 605, 607 of the respective leg openings 604, 602, the combined widths 605, 607, and/or a width 609 of the straddlable portion 611. The handle 370 can hold the user's arms spaced apart from the user's legs for applying tattoos to the user's legs (e.g., front of the user's thighs). The handle 370 can include padding for comfort. In some embodiments, the handle 370 is positioned generally above the leg openings 602, 604 and/or user's thighs positioned in the openings 602, 604. In other embodiments, the handle 370 can be positioned at other locations and can include an adjuster (e.g., a motorized or manual adjuster) for adjusting the handle height and/or orientation (e.g., tilted orientation, horizontal orientation, etc.).

Figure 5:
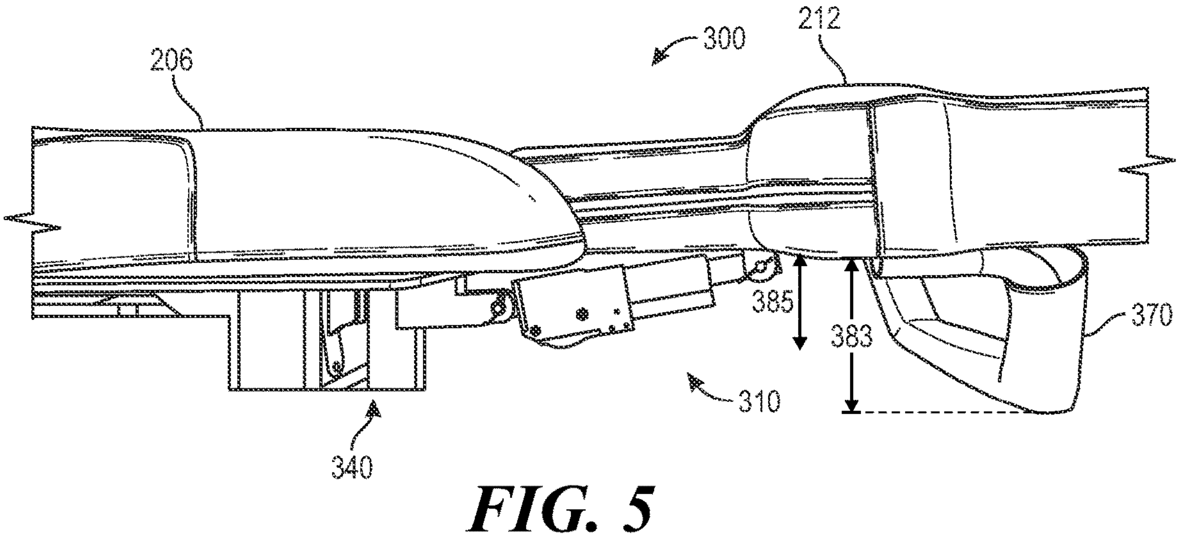
FIG. 5 is a side view of the actuator assembly of FIG. 3.

FIG. 5 is a side view of the actuator assembly 310 in a generally flat of bed configuration. The actuator assembly 310 (shown without a cover) can be generally parallel to the back section 212 and the seat section 206. The control module 340 can be positioned to avoid interference with positioning the user's body. For example, the control module 340 can be positioned directly underneath the bottom of the seat section 206 as illustrated. The handle 370 can be padded and can extend downwardly past the actuator assembly 310 so that the handle 370 serves as a stop. For example, the handle 370 can contact an object below the back section 212 to prevent contact between the actuator assembly 310 and the object. In some embodiments, a ratio of a protruding distance 383 of the handle 370 to a protruding distance 385 of the actuator assembly 310 (or cover 330 of FIG. 4) is equal to or greater than 1.5, 2, 3, 4, or 5. The ratio of protruding distances and configurations of the actuator assembly 310 and handle 370 can be selected based on the objects in the surrounding environment.

Figure 6:
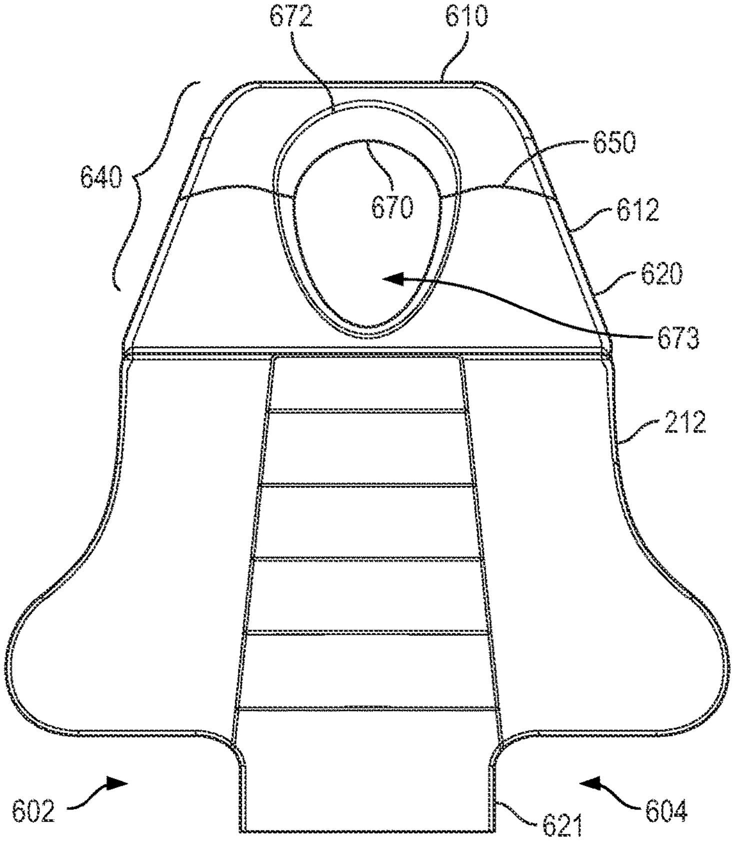
FIG. 6 is a front view of a back section with an integrated headrest in accordance with embodiments of the present technology.

FIG. 6 is a front view of a back section 620 with an integrated headrest 640 in embodiments of the present technology. The headrest 640 can be a split headrest include a movable upper portion 610 and a lower portion 612. The position of the interface 650 between the upper portion 610 and the lower portion 612 can be selected based on the size of the user. The headrest 640 can be moved upwardly or downwardly to accommodate the user's body, as discussed in connection with FIG. 10.

The headrest 640 can include an optional opening 670 for placement of the user's face and/or the back of the user's head. The opening 670 can have a generally circular shape, oval shape, elliptical shape, teardrop shape, or other suitable shape for receiving at least a portion of the user's head. The opening 670 can be generally centered above a straddling portion 621 of the back section 212. This aligns the user's head with the support apparatus 300 for a comfortable posture.

The headrest 640 can have a generally continuous head-supporting edge 672 surrounding the opening 670. The head-supporting edge 672 can comfortably support the user's head. When the support apparatus 300 is in a bed configuration, the opening 670 can receive the back of the user's head while the user's back is against the back section 212. The opening 670 can receive the front of the user's head while the user straddles the back section 212. When the support apparatus 300 is in a bed configuration, the opening 670 can receive the user's face when the user lays face down. The opening 670 can receive the back of the user's head when the user lays face up. When the support apparatus 300 is in a chair configuration and the user straddles the back section 212 (e.g., the user's legs are positioned in openings 602, 604), the support apparatus 300 can support the user's chin. For example, a U-shaped, ergonomic chin rest channel 673 can be uncovered when the upper portion 610 is rotated rearwardly (e.g., away from an occupant of apparatus 300), and the user's chin can be positioned in the chin rest channel 673. The size, shape, configuration, and position of the opening 670 (including the chin rest channel 673) can be selected based on characteristics of the occupant. For example, the chin rest channel 673 can have a narrow form factor to provide a closer fit to support the user's chin, or can have a wide form factor to provide a loose fit and to support a wider range of users. A height of the U-shaped chin rest channel 673 can also be selected based on the desired support, such as by having the lower portion 612 cover or not cover the user's ears while the user's chin is positioned in the chin rest channel 673.

Figure 7:
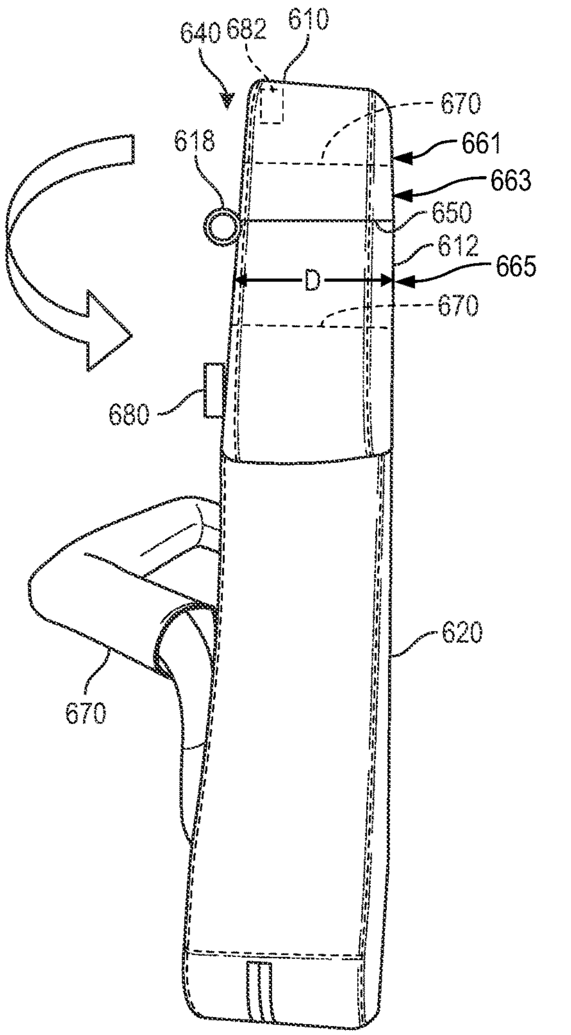
FIGS. 7 and 8 are side views of the headrest of FIG. 6 in a head support configuration and in a chin support configuration, respectively.
Figure 8:
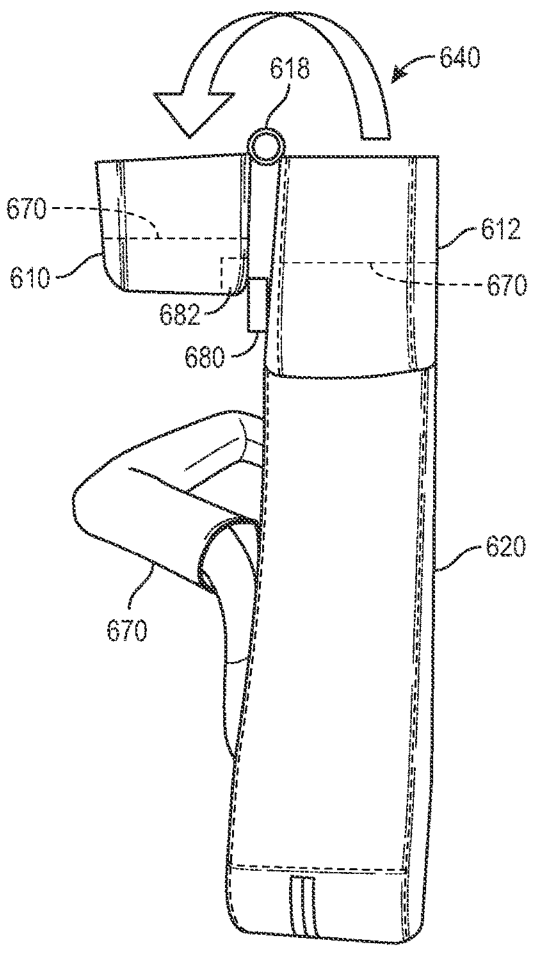

FIGS. 7 and 8 are side views of the headrest 640 in a head support configuration and in a chin support configuration, respectively. The headrest 640 is movable between multiple positions. FIG. 7 shows the headrest 640 at an upright, raised position in which the upper portion 610 extends across the chin support channel 673 (FIG. 6) and FIG. 8 shows the headrest 640 at lowered position.

Referring to FIG. 7, the upper portion 610 is rotatably coupled to the lower portion 612 by, for example, one or more hinges 618, flexible connectors, or other components for permanently coupling together the upper portion 610 and the lower portion 612. The lower portion 612 can include one or more first couplers 680, and the upper portion 610 can include one or more second couplers 682. The first and second couplers 680, 682 can comprise one or more magnets embedded (as shown for the second couplers 682) or attached to the surface (as shown for the first couplers 680). In some embodiments, both the first and second couplers 680, 682 are embedded in the headrest for an aesthetically pleasant appearance. The coupler 682 can be a magnet and the coupler 680 can be, for example, a magnet, a ferrous material, or the like. In some embodiments, the couplers 682, 680 can be coupled together using one or more fields, such as electromagnetic fields. In some embodiments, the first and second couplers 680, 682 can comprise other coupling features, such as Velcro, snap-ins, pins (e.g., lockable pins), retainers, buckles, etc. In some embodiments, the hinge 618 can include a locking mechanism to lock the headrest 640. For example, the hinge 618 can have a locking pin that can be removed to move the headrest 640. The locking pin can be inserted into the hinge to lock the headrest 640 at a set position. U.S. Pat. Nos. 8,651,569 and 9,375,088 disclose lockable hinges that can be incorporated into or coupled to the headrest 640, and some example hinges are discussed in connection with FIGS. 17-21.

The headrest 640 can have a forward-facing surface 661 formed by the upper and lower portions 610, 612. Referring to FIG. 7, the upper portion 610 can be aligned with the lower portion 612 and form a gapless interface 650. The upper and lower portions 610, 612 can define the generally continuous surface 661. In some embodiments, the upper portion 610 has a forward-facing surface 663 that is generally flush with or positioned along the same plane as the front surface 665 of the lower portion 612. The position and sizes of the surfaces 663, 665 can be selected based on the desired user support. The upper portion 610 can extend across and cover the entire length or depth D of the chin rest channel 673. For example, the upper portion 610 can extend across at least 90%, 95%, 98%, or 100% of the channel.

As shown in FIG. 8, the upper portion 610 can be rotated about the hinge 618 by approximately 180 degrees to interface with a rear side of the chin rest 612. This allows a user straddling the back section 620 to place their chin on the chin support 612. The chin rest 612 can be spaced apart from handle 670 to allow the user to rest their arms on the handle 670, which may be padded. The first and second couplers 680, 682 can removably attach to each other to keep the upper portion 610 in the rotated configuration shown in FIG. 8 (e.g., via magnetism, Velcro attachment, etc.). In some embodiments, the hinge 618 can be a locking hinge that can be locked to keep the headrest 640 in a desired configuration (e.g., the head support configuration of FIG. 7, the chin support configuration of FIG. 8) and unlocked to move the headrest 640 between various configurations. The first and second couplers 680, 682 and/or the locking hinge can be particularly beneficial when the apparatus 300 is in a bed configuration.

Figure 9:
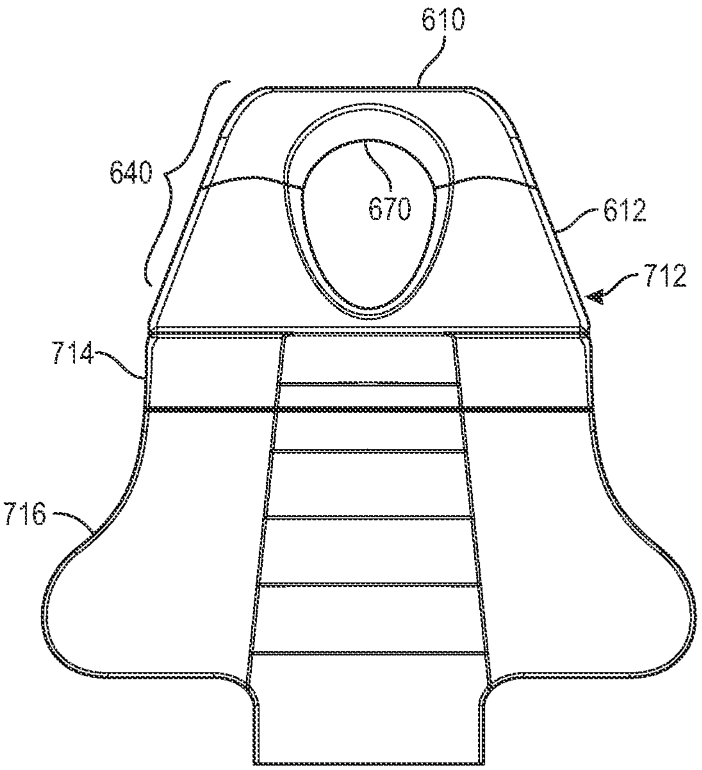
FIGS. 9 and 10 are front views of a back section in a retracted position and in an extended position, respectively.
Figure 10:
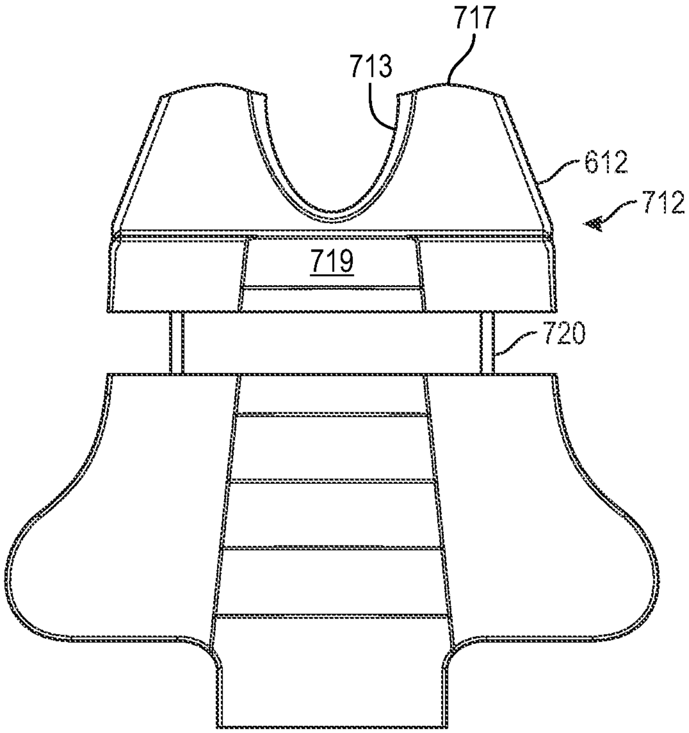

FIGS. 9 and 10 are front views of a back section 712 in a retracted or lowered position and in an extended or raised position, respectively. The description of the back sections discussed in connection with FIGS. 1-8 applies equally to the back section 712 unless indicated otherwise.

Referring to FIG. 9, the back section 712 can include an upper portion 714 and a lower portion 716. An adjustment assembly 720 can allow the upper portion 714 to be moved upwardly away from the lower portion 716, as shown in FIG. 10. This allows a user to adjust the height of the chin rest 612 relative to a seat section (not shown). The adjustability can be selected based on the ranges of sizes for occupants of the apparatus. In some embodiments, the adjustment assembly 720 can comprise rods that a person can manually raise or lower the upper portion 714 along. In some embodiments, the adjustment assembly 720 can comprise actuators that can be controlled via a controller, manual locking elements, pins, etc. In some embodiments, padding or blocks can be positioned on the seat section of the apparatus to elevate the user straddling the back section 712, allowing for further customization for desired comfort.

Referring now to FIG. 10, the user's chin can rest on a U-shaped chin-rest channel 713 while the user's forehead and upper face remain uncovered. The chin-rest channel 713 can help hold the user's head stationary to minimize or limit body movement and can be configured to contact the user's submental region, upper neck, cheeks, and/or lower face. The curvature of the chin-rest channel 713 can be selected based on the characteristics of the user's face and chin. The lower portion 612 can be replaced with another lower portion having a different configuration to provide for customization. When the user's chin is positioned in the chin-rest channel 713, the user's neck and upper chest can lay flush against a support surface 719 of the back section 712, which may include padding. The user can freely move their head upwardly out of the chin-rest channel 713 to change positions or stand up.

Figure 11:
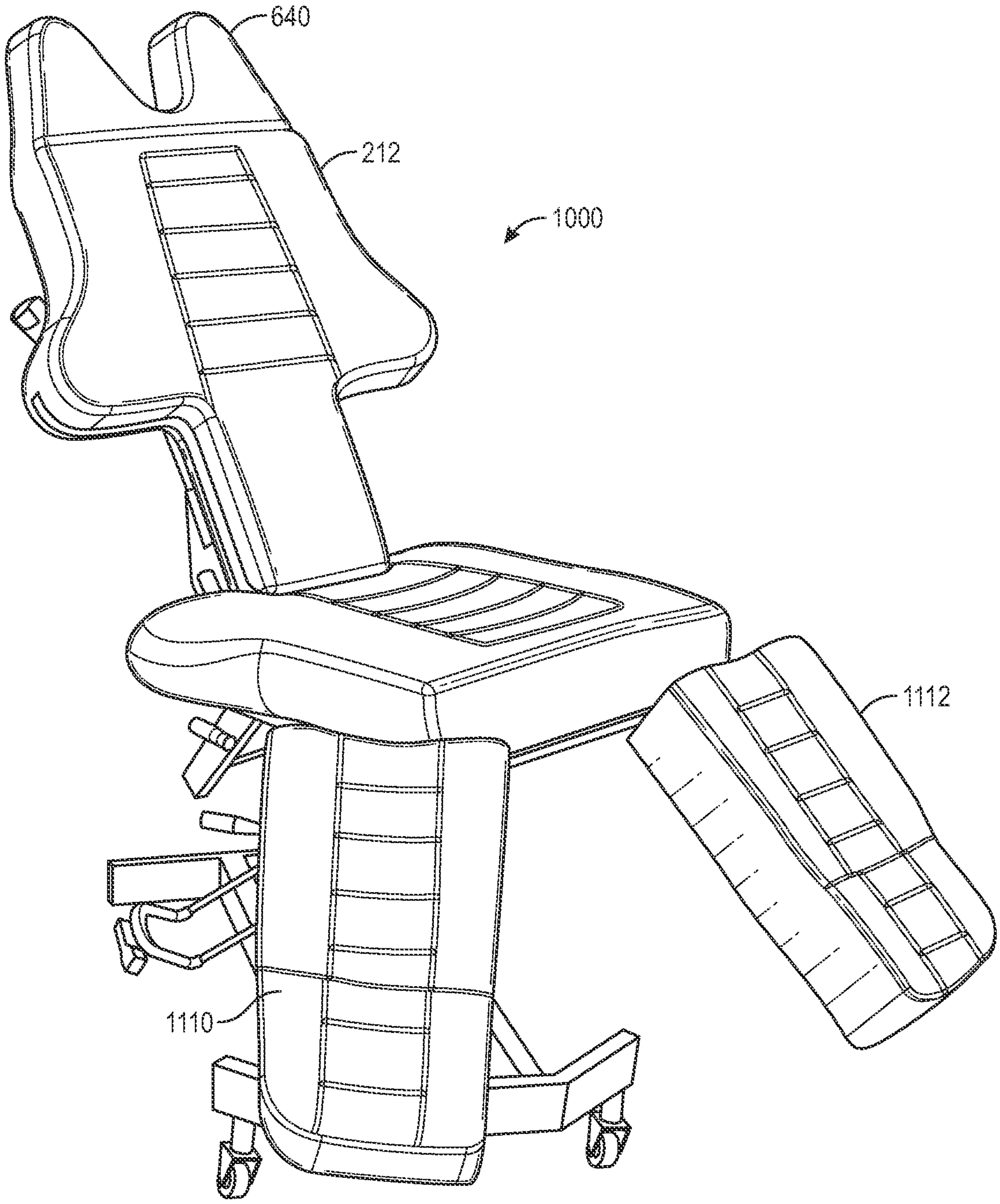
FIG. 11 is an isometric view of a support apparatus in a chair configuration in accordance with embodiments of the present technology.

FIG. 11 is an isometric view of a support apparatus 1000 ("apparatus 1000") in a chair configuration in accordance with embodiments of the present technology. The apparatus 1000 includes the back section 212, the chin rest or headrest 640, and leg supports 1110, 1112. In the illustrated embodiment, the headrest 640 is in a chin rest configuration. The headrest 640 can be removed and replaced with another headrest. Each of the leg supports 1110, 1112 can be rotated about a vertical axis to provide a tattoo artist convenient access to the user's back or other body parts. When the user sits in a forward position (i.e., with their back against the back support 212), the headrest 640 can be replaced with the headrest in a headrest configuration, as discussed in connection with FIGS. 6-8.

Figure 12A:
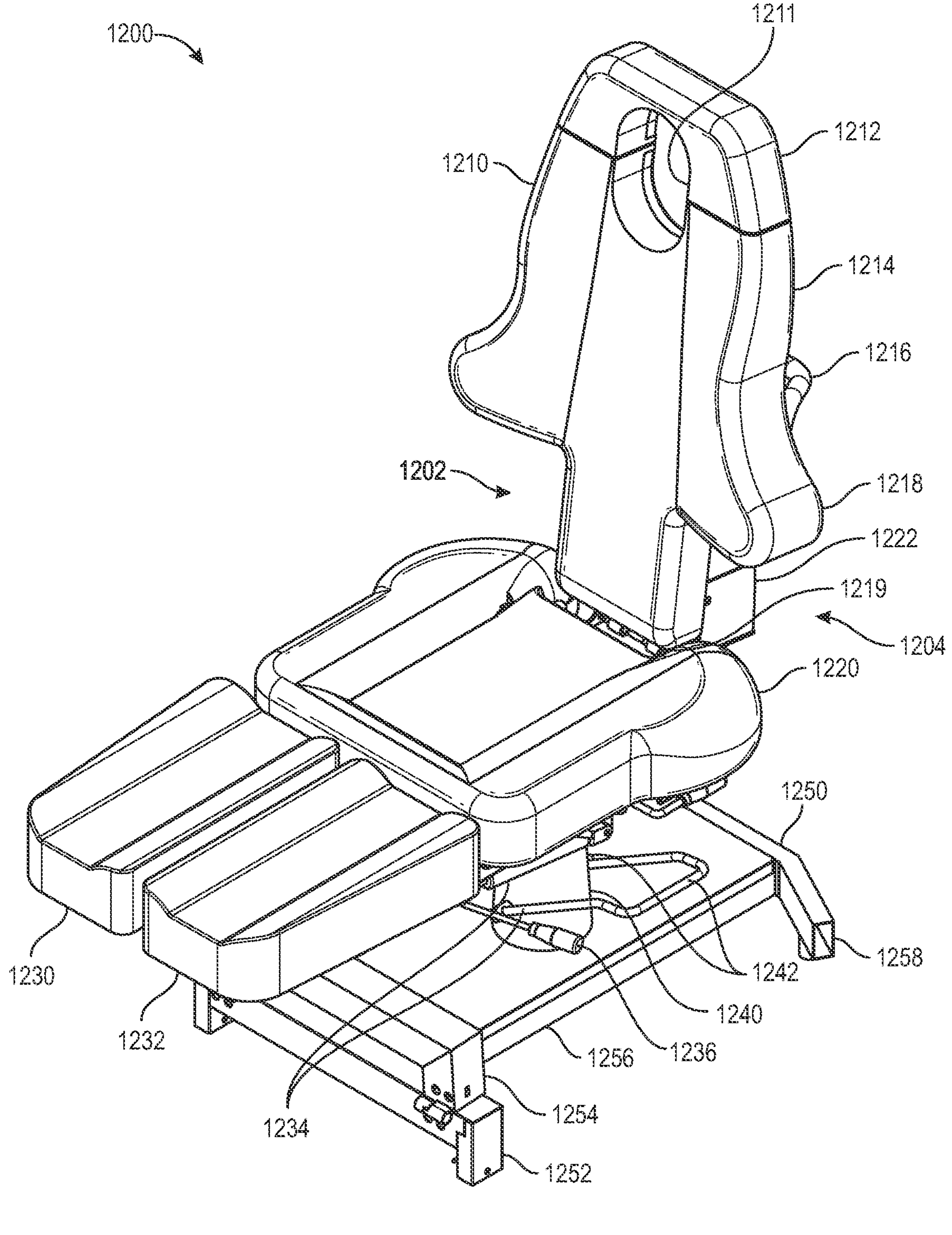
FIGS. 12A-C are front isometric, rear isometric, and front views, respectively, of a support apparatus in a chair configuration in accordance with embodiments of the present technology.
Figure 12B:
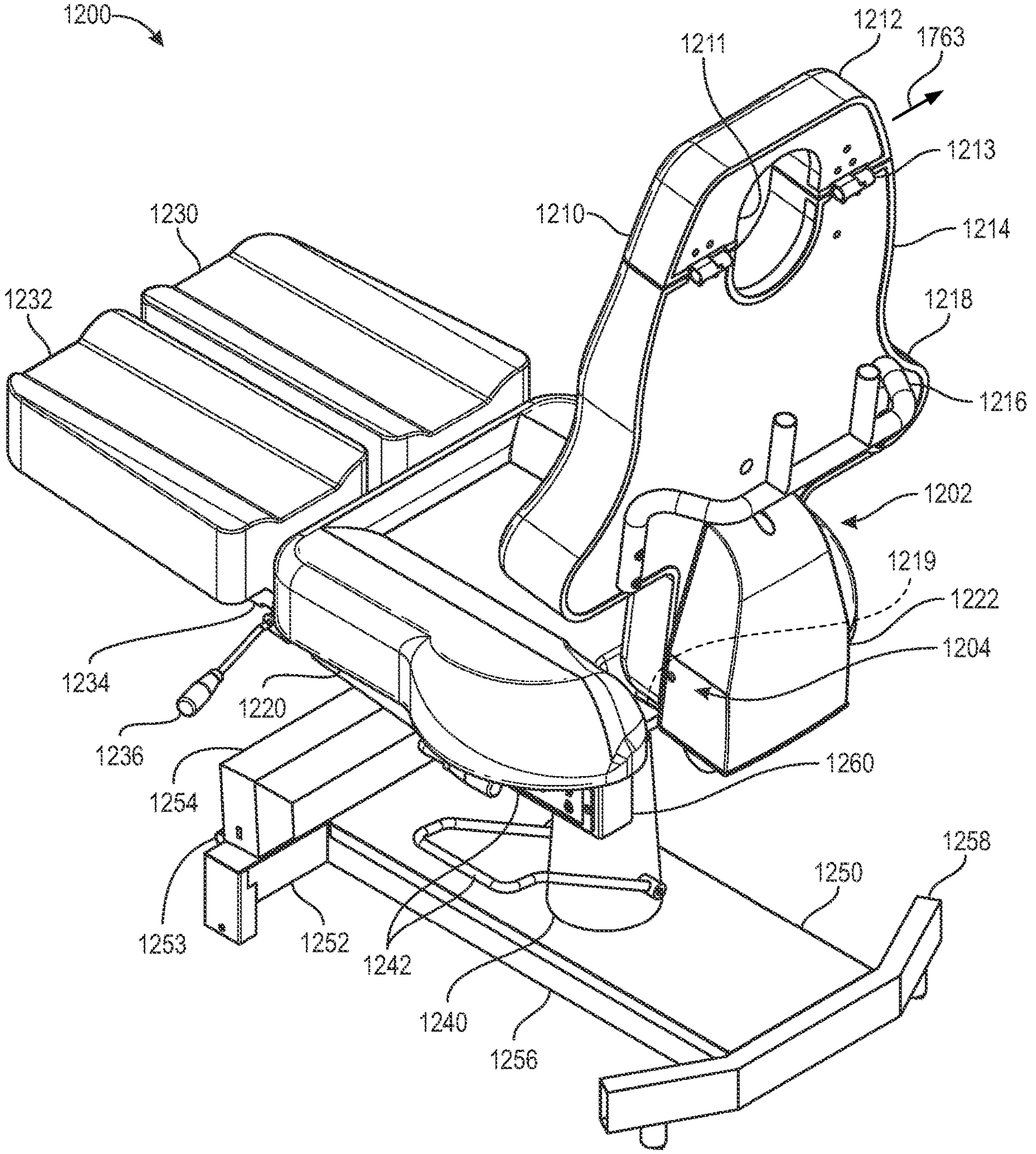
Figure 12C:
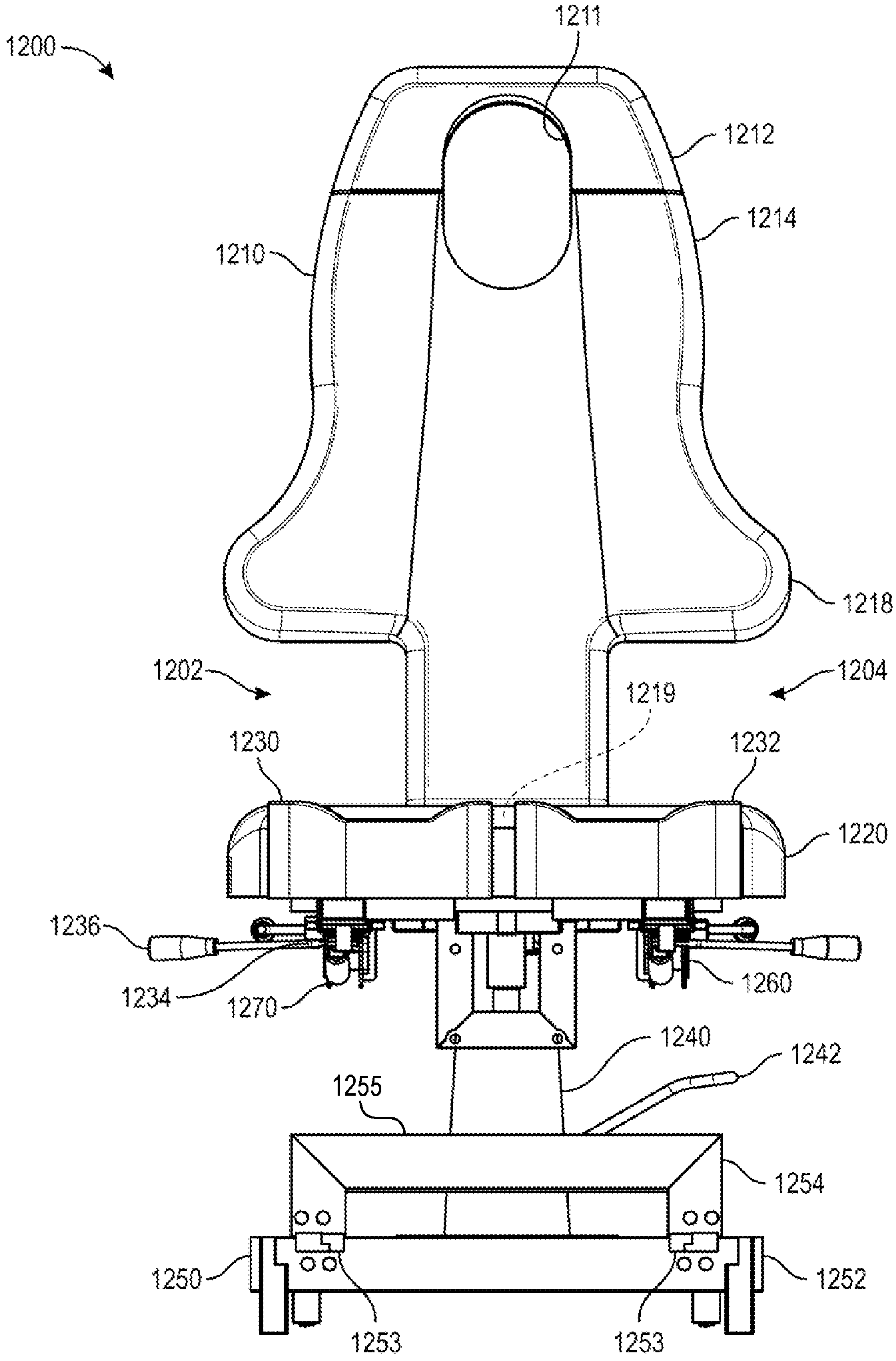

FIGS. 12A-C are front isometric, rear isometric, and front views, respectively, of a support apparatus 1200 ("apparatus 1200") in a chair configuration in accordance with embodiments of the present technology. The apparatus 1200 includes a back section 1210, a seat section 1220 rotatably coupled to the back section 1210 via one or more hinges 1219 (obscured from view), leg sections 1230, 1232, and a base 1250 configuration to support the seat section 1220. The seat section 1220 can be supported by a piston 1240 (e.g., hydraulic piston, pneumatic piston, linear slide) coupled between the seat section 1220 and the base 1250. The piston 1240 can be actuated via a lever 1242 (FIGS. 12B and 12C), which a user can step on for convenient use, in order to lower or raise the height of the seat section 1220. The piston 1240 can also allow rotation of the back section 1210 and seat section 1220 about an axis of rotation (e.g., a vertical axis for rotation). This allows front or back of the seat section 1220 to be positioned above a footrest 1254.

The back section 1210 can include an upper portion 1212 and a lower portion 1214 coupled between the upper portion 1212 and the hinge 1219, handles 1216 attached to a rear side of the lower portion 1214, and two side portions 1218 extending from left and right sides of the lower portion 1214. In some embodiments, the back section 1210 can include an opening 1211 configured to receive a user's head (e.g., if the user is sitting with their back against the back section 1210) or face (e.g., if the user is straddling the back section 1210). The upper portion 1212 can be pivotably attached to the lower portion 1214 via one or more hinges 1213 (FIG. 12B) positioned adjacent to the opening 1211. Operation of the hinges 1213 is described in further detail below with respect to FIGS. 14A and 14B.

A proximal portion of the back section 212 (i.e., below the side portions 1218) can be narrower than the side portions 1218 in order to define leg openings 1202, 1204 configured to receive a user's legs when the user is straddling the back section 1210. The leg openings 1202, 1204 can be formed by removing different types of shapes from the back section 1210 such as, for example, plano-concave, incurvation-shaped, generally rectangular, generally circular, generally oval, or generally square cuts, or cuts defined by a tapering from the proximal end of the back section 1210 to the side portions 1218. In at least one exemplary embodiment, the back section 1210 could be generally "T" or "Y" shaped. In some embodiments, the back section 1210 can be padded to provide comfort to the user.

In some embodiments, the apparatus 1200 can also include an actuator assembly 1222 attached to the back section 1210 and the seat section 1220. In the illustrated embodiments, the actuator assembly 1222 includes a cover. The actuator assembly 1222 can switch the apparatus 1200 between chair and bed configurations, as described in further detail below with respect to FIGS. 13A and 13B. The apparatus 1200 can also include first and second control modules 1260, 1270 attached to a lower side of the seat section 1220. The first and second control modules 1260, 1270 can be used to control the actuator assembly 1222, as described in further detail below with respect to FIGS. 16A and 16B.

In some embodiments, the apparatus 1200 can further include a leg support assembly 1234 attached to lower sides of the leg sections 1230, 1232 and the seat section 1220. The leg support assembly 1234 can include a handle 1236 for positioning and/or orienting the leg sections 1230, 1232 relative to the seat section 1220. For example, each of the leg sections 1230, 1232 can be rotated about a vertical axis.

The base 1250 includes a platform section 1256 configured to support the piston 1240, a base end portion or first end portion 1252 ("first end portion 1252"), an elongate beam 1255 (FIG. 12C) of the footrest 1254 pivotably attached to the first end portion 1252 via one or more hinges 1253, and a second end portion 1258 opposite the first end portion 1252. The footrest 1254 is described in further detail below with respect to FIGS. 15A and 15B. In some embodiments, the seat section 1220 can include a bearing member such that the seat section 1220 can be rotated about a vertical axis relative to the base 1250.

Figure 13A:
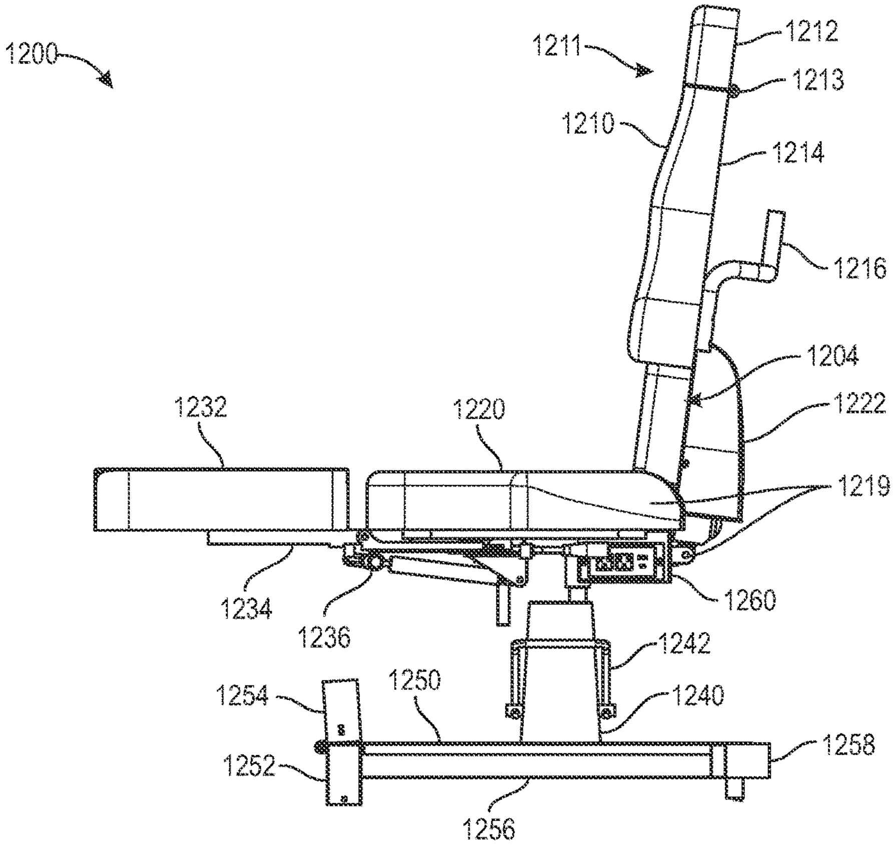
FIGS. 13A and 13B are side views of the support apparatus of FIG. 12A in a chair configuration and in a bed configuration, respectively.
Figure 13B:
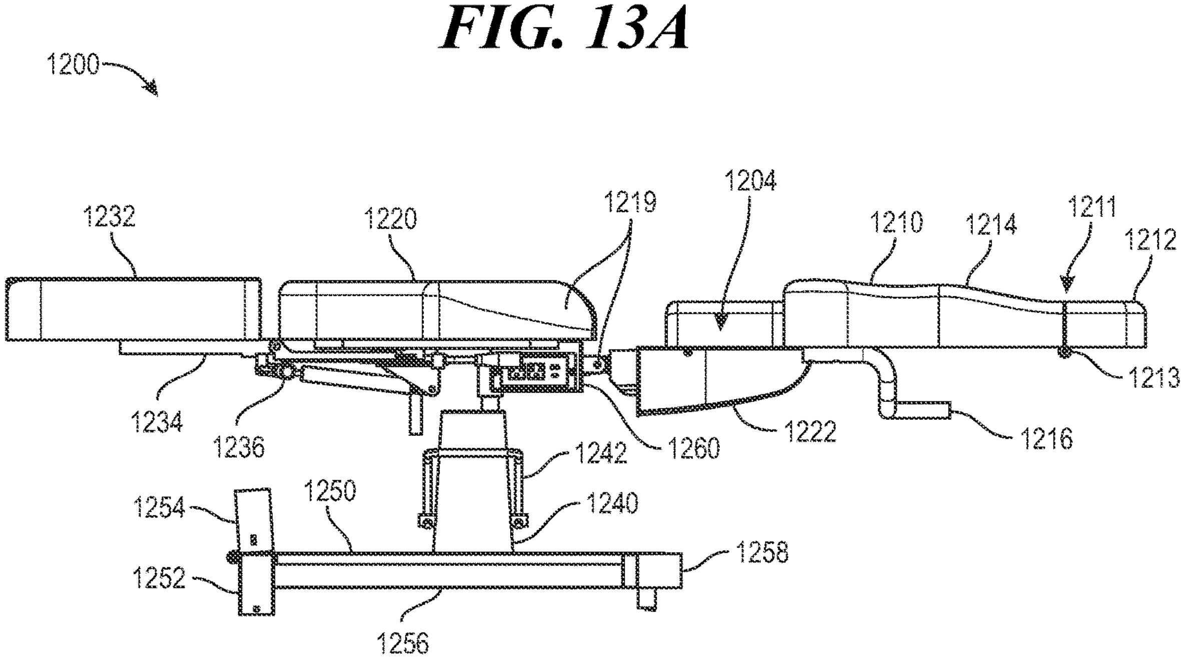

FIGS. 13A and 13B are side views of the apparatus 1200 in the chair configuration and in a bed configuration, respectively. Referring first to FIG. 13A, a user can sit on the seat section 1220 either with the back against the back section 1210 and their head positioned partially in the opening 1211 ("forward position"), or straddling the back section 1210 with their legs positioned through the leg openings 1202, 1204 ("backward position"). When the user is in the forward position, the user can place their legs on the leg sections 1230, 1232 oriented horizontally in order to, for example, receive a tattoo on their leg. Alternatively, the leg support assembly 1234 can be adjusted (e.g., via the handle 1236) to position individual ones of the leg sections 1230, 1232 at a different angle (e.g., 45 degrees from the horizontal position as illustrated, oriented vertically such that the user's legs extend toward the floor). When the user is in the backward position, the user can hold onto the handles 1216 while, for example, receiving a tattoo on their back. The leg sections 1230, 1232 can be adjusted to provide a tattoo artist access to the user's back.

Referring next to FIG. 13B, the apparatus 1200 can be switched to the bed configuration by pivoting the back section 1210 about the hinge 1219 manually or via the actuator assembly 1222. As shown, the back section 1210, the seat section 1220, and the leg sections 1230, 1232 can form a generally flat surface for a user to lay on (e.g., on their back, on their chest, on their side). If the user is lying on their chest, they can grab onto the handles 1216.

Figure 14A:
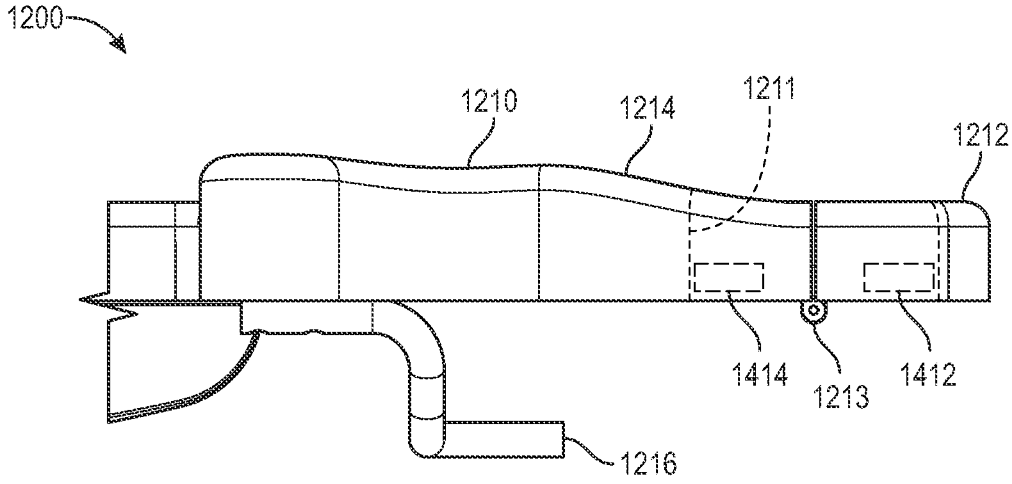
FIGS. 14A and 14B are enlarged side views of a back section of the support apparatus of FIG. 12A in a head support configuration and in a chin support configuration, respectively.
Figure 14B:
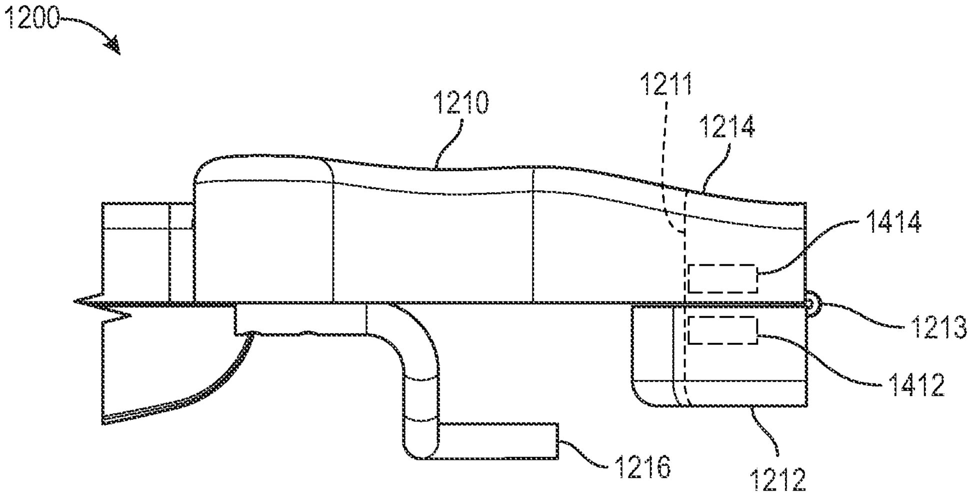

FIGS. 14A and 14B are enlarged side views of the back section 1210 of the apparatus 1200 in a head support configuration and in a chin support configuration, respectively. It is appreciated that the apparatus 1200 can be used in each of the head support and chin support configurations whether the apparatus is in the chair configuration (FIGS. 12A-C) or in the bed configuration (FIGS. 14A and 14B). Referring first to FIG. 14A, the upper portion 1212 can be positioned generally parallel to the lower portion 1214 to form the opening 1211 therebetween. The head support configuration can be beneficial when, for example, the user is sitting down while the apparatus 1200 is in the chair configuration and while receiving a tattoo on their arms or legs. In some embodiments, coupling features (e.g., magnets, Velcro, snap-ins) (not shown) can be included at the interface between the upper and lower portions 1212, 1214 to keep the back section 1210 in the head support configuration. In some embodiments, the upper portion 1212 can include a first coupler 1412 and the lower portion 1214 can include a second coupler 1414. Each of the first and second couplers 1412, 1414 can comprise a magnet, Velcro, snap-ins, or other coupling features.

Referring next to FIG. 14B, the upper portion 1212 can be pivoted about the hinges 1213 by approximately 180 degrees to interface a rear side of the lower portion 1214. The chin support configuration can be beneficial when, for example, the user is lying down on their chest while the apparatus 1200 is in the bed configuration and while receiving a tattoo on their back. In the illustrated embodiment, the first and second couplers 1412, 1414 are embedded inside the upper and lower portions 1212, 1214, respectively (e.g., suitable if the first and second couplers 1412, 1414 comprise magnets). In other embodiments, the first and second couplers 1412, 1414 can be attached to the surfaces of the upper and lower portions 1212, 1214. While the back section 1210 is in the chin support configuration (FIG. 14B), a user can place their chin on the lower portion 1214 while straddling the back section 1210 (if the apparatus 1200 is in the chair configuration) or while lying down (if the apparatus 1200 is in the bed configuration). In some embodiments, the hinges 1213 can comprise locked hinges that can keep the upper portion 1212 at a desired angle relative to the lower portion 1214 when locked, and can allow pivoting when unlocked. The first and second couplers 1412, 1414 and the locked hinges 1213 can help keep the back section 1210 in the head support configuration or the chin support configuration as desired. In the illustrated embodiment, the top and bottom edges of the opening 1211 align when the back section 1210 is in the chin support configuration. In other embodiments, the top and bottom edges of the opening 1211 may not align when the back section 1210 is in the chin support configuration.

Figure 15A:
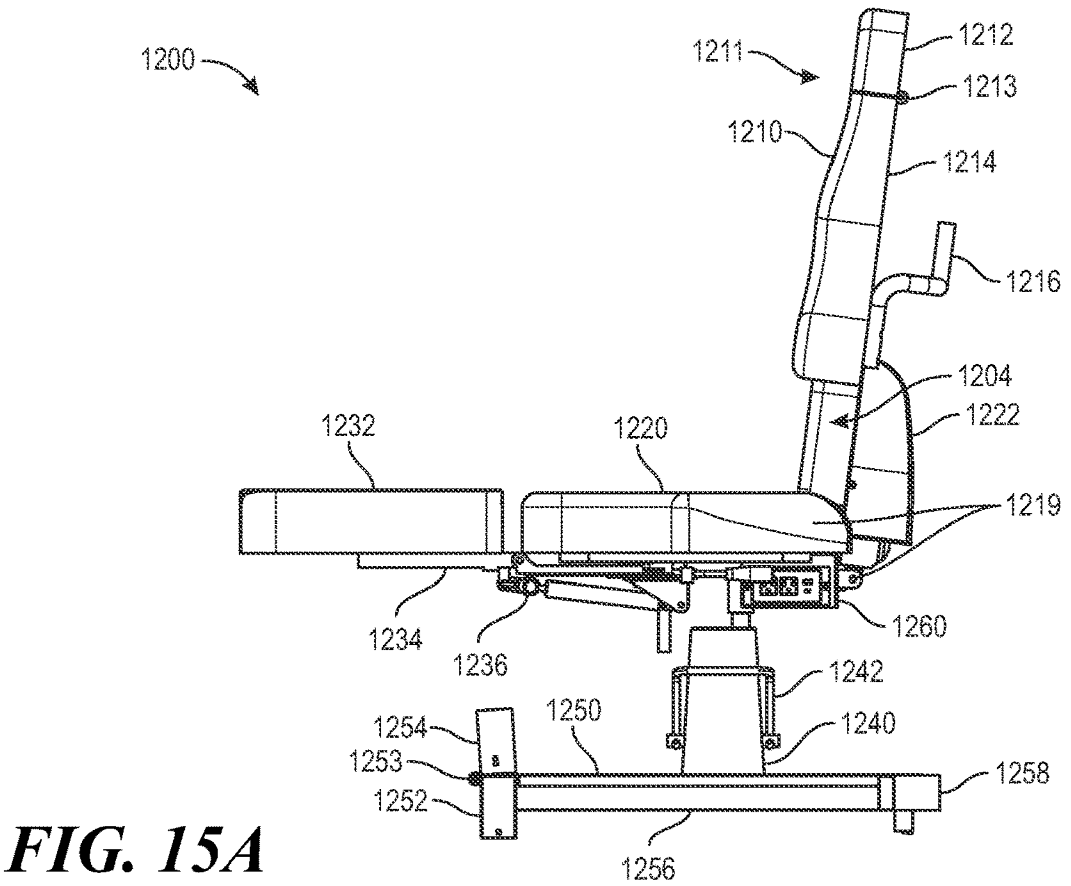
FIGS. 15A and 15B are side views of a footrest of the support apparatus of FIG. 12A in a raised configuration and in a lowered configuration, respectively.
Figure 15B:
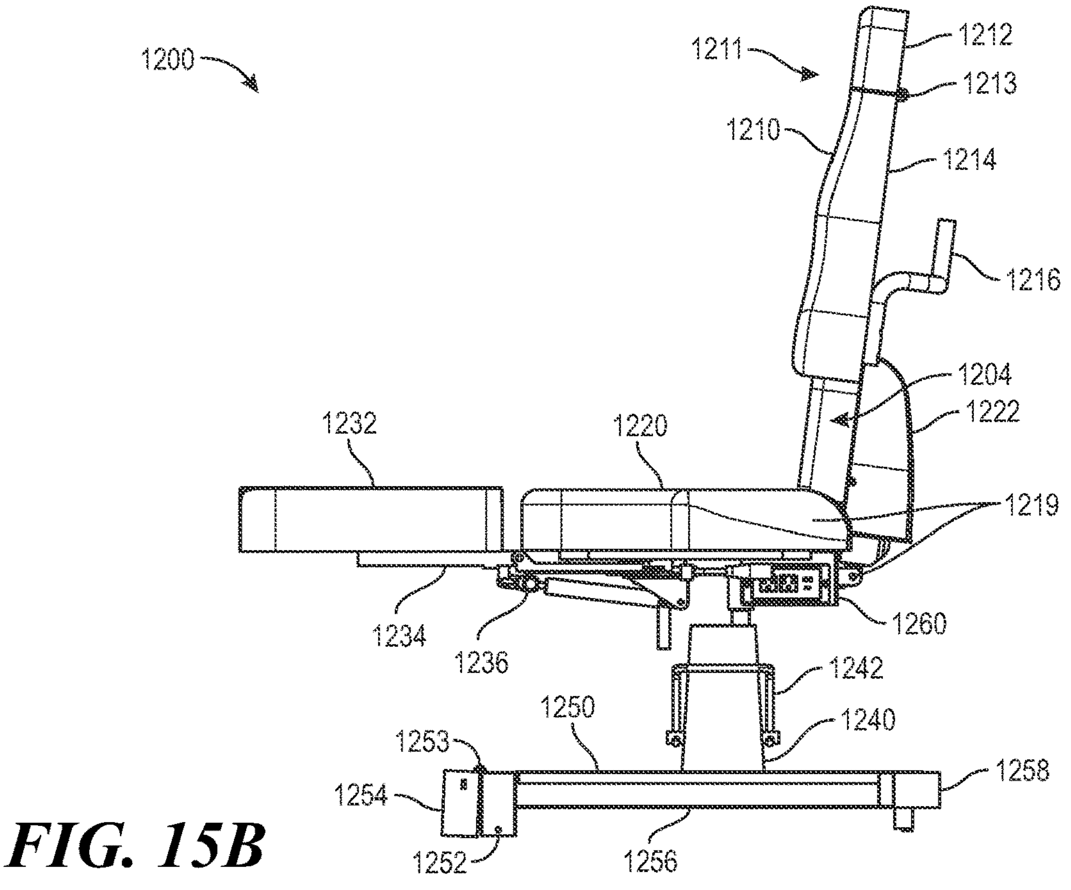

FIGS. 15A and 15B are side views of the footrest 1254 in a raised configuration and in a lowered configuration, respectively. As illustrated in FIGS. 12A-C, the footrest 1254 can comprise three rectangular sections arranged in a U-shape, with two of the sections attached to the hinges 1253. In other embodiments, the footrest 1254 can have other shapes. The dimensions of the footrest 1254 can be set depending on the height range of the seat section 1220, the height of the user, the height of the tattoo artist, etc. The footrest 1254 can be used by the user supported by the apparatus 1200 and/or a tattoo artist applying tattoos on the user. For example, if the apparatus 1200 is in the chair configuration and the user is straddling the back section 1210, the leg sections 1230, 1232 can be rotated out of the way for a tattoo artist sitting on a stool to place their feet on the footrest 1254 while the tattoo artist is applying a tattoo on the user's back or other body part. The footrest 1254 can be positioned generally below (e.g., directly below or laterally offset a preset distance) or subjacent the front of the seat section 1220 (e.g., see FIG. 15A) or rear of the seat section 1220 by rotating the seat section 1220 via the piston 1240. For example, the seat section 1220 can be rotated 180 degrees to position the leg opening 1204, actuator assembly 1222, etc. generally above the footrest 1254. In some embodiments, the base 1250 has two footrests, one footrest at the second end portion 1258 and another footrest at the first end portion 1252. The number, position, and configuration of the footrests can be selected based on the desired support of the user during a tattoo session.

Referring first to FIG. 15A, the footrest 1254 can be in the raised position, providing maximum foot-support height for the user and/or the tattoo artist. The dimensions of the footrest 1254 and the first end portion 1252 determine the total height of the footrest 1254 while in the raised configuration. Referring next to FIG. 15B, the footrest 1254 can be pivoted about the hinges 1253 by approximately (e.g., 180 degrees, 180 degrees, or 190 degrees) to be in the lowered position, providing minimum height for the user and/or the tattoo artist. The dimensions of the first end portion 1252 determines the total or lowered height while in the lowered configuration, and the footrest 1254 can provide additional surface area for the user or tattoo artist's feet. In some embodiments, the footrest 1254 can include coupling features (e.g., magnets, Velcro, snap-ins, pins) that help keep the footrest 1254 in either the raised or lowered position. In some embodiments, the hinges 1253 can comprise locked hinges such that the footrest 1254 can be maintained at a desired angle relative to the first end portion 1252. In some embodiments, the footrest 1254 can include independently rotatable left and right footrests. This allows the user's left and right foot to be supported at different heights. Example hinges are discussed in connection with FIGS. 17-21.

Figure 16A:
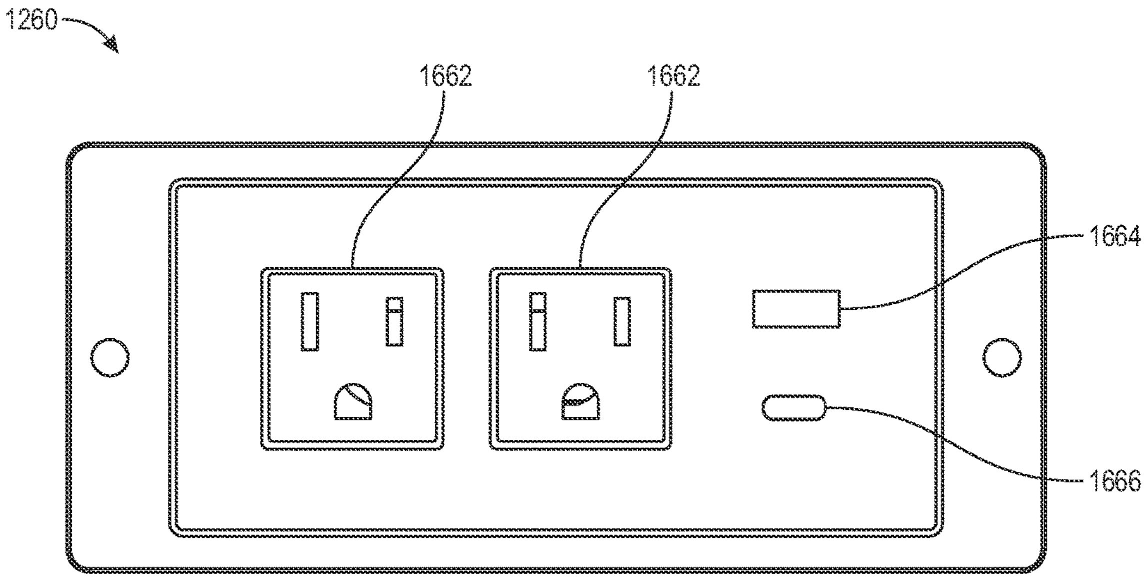
FIGS. 16A and 16B are plan views of control modules included in the support apparatus of FIG. 12A.
Figure 16B:
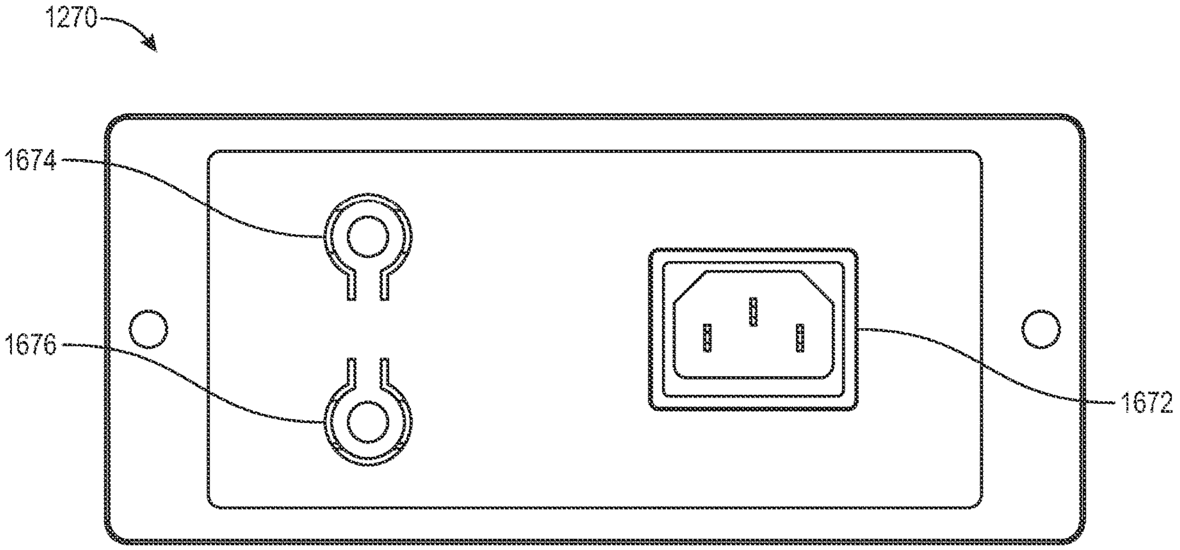

FIGS. 16A and 16B are plan views of the first control module 1260 and the second control module 1270, respectively. The first and second control modules 1260, 1270 can be attached to any one or more of the components of the apparatus 1200, such as the seat section 1220. In the illustrated embodiments, the first control module 1260 includes multiple power outlets 1662, a USB-B port 1664, and a USB-C port 1666, and the second control module 1270 includes a power outlet 1672, a first control button 1674, and a second control button 1676. In some embodiments, the apparatus 1200 can be powered by an external power source (e.g., an external power outlet, batteries) to power, for example, the actuator assembly 1222, and the power outlets 1662, 1672, the USB-B port 1664, and the USB-C port 1666 can route power from the same external power source. Advantageously, the power outlets 1662, 1672, the USB-B port 1664, and the USB-C port 1666 can receive an electrical plug of one or more electrical tools for tattooing. In some embodiments, the USB-B port 1664 and/or the USB-C port 1666 can receive control signals from a controller to operate various components of the apparatus 1200.

In some embodiments, first and second control buttons 1674, 1676 can be used (e.g., by the user and/or the tattoo artist) to operate a controller that includes one or more memory, processors, processing units, input devices, keypads, switches, remotes, displays, screens, or combinations thereof. The controller can be in communication with components via wired connections, wireless connections, or both. The controller can be in communication with components via wired and/or wireless connections. The controller can be used to move (e.g., raise, lower, rotate, etc.), expand/contract, or otherwise alter a component. Controllable components can include the actuator assembly 1222 and the leg support assembly 1234. In some embodiments, the apparatus 1200 can further include motorized actuators operatively coupled to the hinges 1213 and/or the hinges 1253, and the controller can be operated to control the rotation of the hinges 1213 and/or the hinges 1253. In some embodiments, the apparatus 1200 can further include an adjustment assembly (e.g., the adjustment assembly 720) configured to extend a part of the lower portion 1214 (e.g., similar to the illustrated embodiments in FIGS. 9 and 10) such that the apparatus 1200 can accommodate generally taller users. The controller can be used to actuate the adjustment assembly. In some embodiments, the user can also reconfigure the apparatus 1200 automatically based on preset configurations defined, for example, by the user, the manufacturer, or the like.

Figure 17:
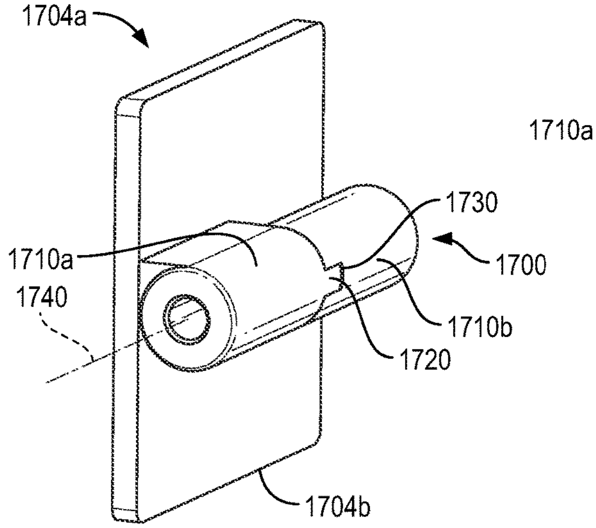
FIGS. 17-19 are front isometric, front, and exploded views, respectively, of a hinge in accordance with embodiments of the present technology.
Figure 18:
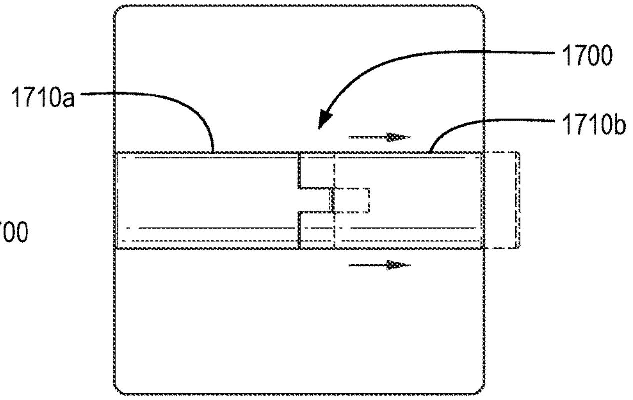
Figure 19:
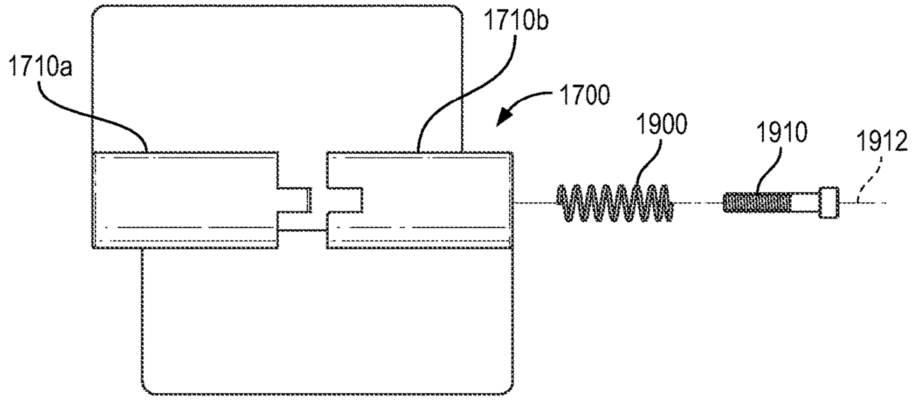

FIGS. 17-19 show a hinge 1700 in accordance with some embodiments of the technology. The hinge 1700 can be an example of any one or more of the hinges discussed above. Referring to FIG. 17, the hinge 1700 can include a first mounting plate 1704*a*, a second mounting plate 1704*b*, and barrels 1710*a*, 1710*b*. The barrels 1710*a*, 1710*b* are configured to allow for manual locking and unlocking. For example, the barrels 1710*a*, 1710*b* key to or engage one another for locking. In the illustrated embodiment, the barrel 1710*a* includes a protrusion or key 1720 that is received within a channel or notch 1730 of the barrel 1710*b*. A user can separate the barrels 1710*a*, 1710*b* to allow rotation of one of the barrels about an axis of rotation 1740.

Referring now to FIG. 18, the hinge 1700 can be moved to an unlocked position by separating the barrels 1710*a*, 1710*b*. For example, the barrel 1710*b* can be moved (indicated by arrows) from the locked position to an unlocked position (illustrated in phantom line). In some embodiments, the hinge 1700 can be unlocked by sliding at least a portion of a headrest sideways. For example, the hinges 1213 of FIG. 12B can be unlocked by pushing the upper portion 1212 sideways, as indicated by arrow 1763. Once the hinge 1213 of FIG. 12B is unlocked, the user can rotate the upper portion 1212 downwardly. Once the upper portion 1212 is in the desired position, the user can allow the hinge 1213 to return to the locked position. The hinge 1213 can be biased via one or more springs to the illustrated locked configuration.

FIG. 19 is an exploded front view of the hinge 1700 further including one or more biasing element 1900 (e.g., a coil spring, a helical spring, etc.) and a fastener 1910 (e.g., a pin, a screw). The fastener 1910 can extend through the biasing element 1900 and can hold together the barrels 1710*a*, 1710*b* such that a longitudinal axis 1912 of the fastener 1910 is generally aligned with the axis of rotation 1740 of FIG. 17. The configuration and components of the hinge 1700 can be selected based on a desired range of motion, number of preset positions (e.g., 2, 3, 4, 5, 6, or other number of present positions), etc.

Figure 20:
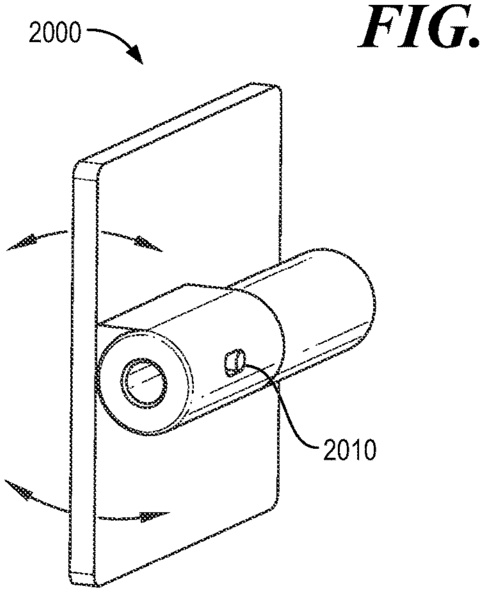
FIG. 20 is an isometric view of a hinge with a locking and unlocking mechanism in accordance with embodiments of the present technology.

FIG. 20 is an isometric view of a hinge 2000 that includes a locking/unlocking element 2010. The locking/unlocking element 2010 can be depressed by a user to unlock the hinge 2000. The hinge 2000 can include, without limitation, one or more internal locking mechanisms, latching mechanisms, biasing elements, or other components to allow the locking and unlocking of internal components. Once unlocked, the hinge 2000 can be rotated, as indicated by the arrows.

Figure 21:
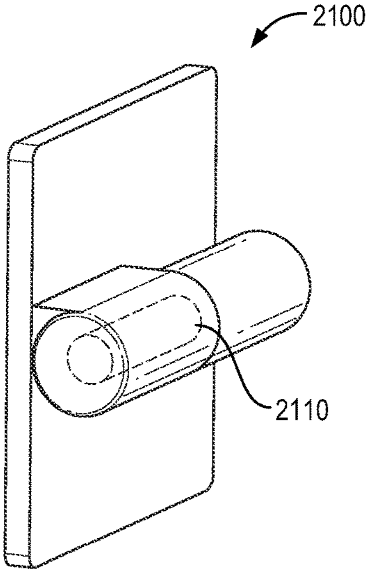
FIG. 21 is an isometric view of a motorized hinge in accordance with embodiments of the present technology.

FIG. 21 is an isometric view of a motorized hinge 2100 in accordance with embodiments of the technology. The hinge 2100 can include one or more motors, actuators, controllers, power sources, and other components 2110 for providing motorized rotation. Any one or more of the hinges 1700, 2000, and 2100 can also include one or more gears, ratcheting features, positioning elements, or other features for allowing the hinge 1700 to be locked at a plurality of angular orientations.

Accessories can be attached to the support apparatuses. Example accessories include, without limitation, arm rests, trays, arm supports, and other components described herein. During a tattooing session, the apparatuses 100, 300, 1000, 1200 can be reconfigured any number of times to keep the client and tattoo artist comfortable. All patents and patent applications referenced herein are incorporated by reference in their entireties. The embodiments, features, methods, and techniques described herein may be incorporated into other types of support apparatuses (e.g., stools, chairs, surgical bed attachments, or the like) using a wide range of settings. In some embodiments, the apparatuses and systems disclosed herein can include one or more features, systems, devices, materials, methods, and techniques described in U.S. Pat. Nos. 8,651,569, 9,375,088, 9,084,486, 9,451,831, and 9,814,313; U.S. patent application Ser. Nos. 12/876,956, 14/151,753, 16/363,862, and 16/274,059; and App. No. PCT/US19/18100, which are incorporated by reference in their entireties. For example, the support systems disclosed herein can include one or more hydraulic systems, hinges, locking mechanisms, controllers, or other components disclosed in U.S. Pat. Nos. 8,651,569; 9,375,088; 9,084,486; 9,451,831; 10,238,213; 10,264,885; 10,506,881; 10,638,843; 10,959,523; and 9,814,313; U.S. patent application Ser. Nos. 12/876,956; 14/151,753; 16/363,862; 16/274,059; and Ser. No. 16/992,850; and App. No. PCT/US19/18100, which are incorporated by reference in their entireties. In addition, the embodiments, features, systems, devices, materials, methods, and techniques disclosed herein may, in certain embodiments, be applied or used in connection with one or more of the embodiments, features, systems, devices, materials, methods, and techniques disclosed in any of the above-mentioned U.S. patents or applications. All of the U.S. patents or applications referenced herein are incorporated by reference in their entireties.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples can be combined in any suitable manner, and placed into a respective independent example. The other examples can be presented in a similar manner.

1. A chair, comprising:
 a seat section; and
 a back assembly coupled to the seat section and including:
  a back section configured to be straddled by a user and pivotally coupled to the seat section; and
  a headrest having a chin-support portion and an upper head-support portion
  rotatable relative to the chin-support portion, wherein the headrest is reconfigurable between a head support configuration and a chin support configuration, wherein the chin-support portion and the upper head-support portion define a head-receiving opening when the headrest is in the head support configuration, and wherein the upper head-support portion uncovers the chin-support portion to expose a chin-receiving channel of the chin-support portion when the headrest is moved to the chin support configuration.

2. The chair of example 1, wherein a rear side of the back section interfaces a rear side of the upper head-support portion when the headrest is the chin support configuration.

3. The chair of any one of examples 1-2, wherein the chin-support portion includes a first attachment feature, wherein the upper head-support portion includes a second attachment feature, and wherein the first and second attachment features are configured to releasably attach to each other when the back section is in the chin support configuration.

4. The chair of example 3, wherein each of the first and second attachment features comprises a magnet embedded inside the upper head-support or chin-support portions.

The chair of any one of examples 3-4, wherein each of the first and second attachment features comprises a magnet positioned at a rear side of the upper head-support or chin-support portion.

6. The chair of any one of examples 1-5, wherein the chin-support includes an adjustment assembly positioned between the chin-support portion and the upper head-support portion, wherein the adjustment assembly is configured to change a distance between the upper head-support or chin-support portions.

7. The chair of any one of examples 1-6, wherein a rear side of the chin-support portion contacts a rear side of the upper head-support portion when the back section is in the chin support configuration.

8. The chair of any one of examples 1-7, wherein the upper head-support portion is pivotably coupled to the chin-support portion via at least one hinge operatively coupled to an actuator, wherein the actuator is configured to reconfigure the back section between the head support configuration and the chin support configuration.

9. The chair of any one of examples 1-8, wherein the back section further comprises a handle attached to a rear side of the chin-support portion.

10. The chair of any one of examples 1-9, further comprising:
 a base coupled to a lower side of the seat section; and
 a footrest pivotably coupled to the base and positionable to be subjacent an end of the seat section.

11. The chair of any one of examples 1-10, wherein the chair is reconfigurable to be in a bed configuration.

12. A support apparatus, comprising:
 a seat section;
 a back section pivotably coupled to the seat section;
 a base coupled to a lower side of the seat section, the base having a base end portion; and
 a footrest rotatably coupled to the base end portion, wherein the footrest is reconfigurable between a raised configuration and a lowered configuration.

13. The support apparatus of example 12, wherein the footrest comprises an elongate beam pivotably coupled to the base end portion via at least one hinge.

14. The support apparatus of any one of examples 12-13, wherein the footrest is pivotably coupled to the base end portion via at least one hinge operatively coupled to an actuator, wherein the actuator is configured to reconfigure the footrest between the raised configuration and the lowered configuration.

15. The support apparatus of any one of examples 12-14, wherein the support apparatus is reconfigurable between a chair configuration and a bed configuration, wherein the back section is oriented at an angle relative to the seat section when in the chair configuration, and wherein the back section is oriented generally parallel to the seat section when in the bed configuration.

16. The support apparatus of any one of examples 12-15, wherein the back section has a narrowed lower portion configured to be straddled by a user.

17. The support apparatus of any one of examples 12-16, wherein the footrest is positionable generally below opposing ends of a seat section by rotating the seat section relative to the base.

18. The support apparatus of any one of examples 12-17, wherein the footrest is configured to support a user's feet when the user faces toward and straddles the back section and when the user faces away from the back section.

19. The support apparatus of any one of examples 12-18, wherein the footrest is spring-loaded to bias toward a locked configuration.

20. The support apparatus of any one of examples 12-19, wherein the footrest is translatable along a longitudinal axis of the footrest for unlocking and locking.

21. The support apparatus of any one of examples 12-20, wherein the footrest includes independently rotatable left and right footrests.

22. A support apparatus, comprising:
 a seat section; and a straddable back assembly pivotably coupled to the seat section and including a split headrest reconfigurable between a chin-support configuration and a head-support configuration, wherein the split headrest defines a head-receiving opening when the split headrest is in a head support configuration, and wherein the split headrest has a chin-receiving channel that becomes accessible when the split headrest is moved to a chin support configuration.

23. The support apparatus of example 22, wherein the split headrest is movable between an open configuration for the chin support configuration and a closed configuration for the head support configuration.

24. The support apparatus of any one of examples 22-23, wherein a rear side of a back portion of the straddable back assembly interfaces a rear side of a rotatable head-support portion of the split headrest when the split headrest is the chin support configuration.

The support apparatus of any one of examples 22-24, wherein the split headrest has one or more rods slidably retained by a backrest of the straddable back assembly.

26. The support apparatus of any one of examples 22-25, further comprising one or more embedded magnets for holding the split headrest in the chin-support configuration and/or the head-support configuration.

27. The support apparatus of any one of examples 22-26, further comprising a lockable hinge configured to allow a user to move the split headrest between the chin-support configuration and the head-support configuration.

28. The support apparatus of any one of examples 22-27, further comprising:

a base rotatably coupled to a lower side of the seat section; and a footrest pivotably coupled to the base and movable between a plurality of heights.

29. The support apparatus of any one of examples 22-28, wherein the straddable back assembly includes a back section defining leg openings, and at least one hinge rotatably coupling the split headrest to the back section.

30. The support apparatus of any one of examples 22-29, wherein the straddable back assembly includes a back section defining leg openings, wherein the split headrest is detachably coupled to the back section.

31. The support apparatus of any one of examples 22-30, wherein the split headrest has a generally continuous cushioned edge portion surrounding the head-receiving opening when the split headrest is in the head support configuration.

32. The support apparatus of any one of examples 22-31, wherein the split headrest includes two U-shaped portions pivotally coupled together.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed:

1. A chair, comprising:

a seat section; and a back assembly coupled to the seat section and including:

a back section configured to be straddled by a user and pivotally coupled to the seat section; and a headrest having a chin-support portion and an upper head-support portion rotatable relative to the chin-support portion, wherein the headrest is reconfigurable between a head support configuration and a chin support configuration, wherein the chin-support portion and the upper head-support portion define a head-receiving opening when the headrest is in the head support configuration, and wherein the upper head-support portion uncovers the chin-support portion to expose a chin-receiving channel of the chin-support portion when the headrest is moved to the chin support configuration.

2. The chair of claim 1, wherein a rear side of the back section interfaces a rear side of the upper head-support portion when the headrest is in the chin support configuration.

3. The chair of claim 1, wherein the chin-support portion includes a first attachment feature, wherein the upper head-support portion includes a second attachment feature, and wherein the first and second attachment features are configured to releasably attach to each other when the back section is in the chin support configuration.

4. The chair of claim 3, wherein each of the first and second attachment features comprises a magnet.

5. The chair of claim 3, wherein of the first attachment feature comprises a first magnet positioned at a rear side of the upper head-support, and wherein the second attachment feature comprises a second magnet positioned at a rear side of the chin support portion.

6. The chair of claim 1, wherein the chin-support includes an adjustment assembly positioned between the chin-support portion and the upper head-support portion, wherein the adjustment assembly is configured to change a distance between the upper head-support portion and the chin-support portion.

7. The chair of claim 1, wherein a rear side of the chin-support portion contacts a rear side of the upper head-support portion when the back section is in the chin support configuration.

8. The chair of claim 1, wherein the upper head-support portion is pivotably coupled to the chin-support portion via at least one hinge operatively coupled to an actuator, wherein the actuator is configured to reconfigure the back section between the head support configuration and the chin support configuration.

9. The chair of claim 1, wherein the back section further comprises a handle attached to a rear side of the chin-support portion.

10. The chair of claim 1, further comprising:

a base coupled to a lower side of the seat section; and a footrest pivotably coupled to the base and positionable to be subjacent an end of the seat section.

11. The chair of claim 1, wherein the chair is reconfigurable to be in a bed configuration.

12. A support apparatus, comprising:

a seat section;

a pair of padded leg sections rotatably coupled to the seat section and configured to support an occupant's lower legs when the occupant sits on the seat section;

a back section pivotably coupled to the seat section;

a base coupled to a lower side of the seat section and configured to rest on a flat surface, the base having a base end portion; and a footrest rotatably coupled to the base end portion and spaced apart from the seat section and the pair of padded leg sections, wherein the footrest is reconfigurable between a raised configuration for supporting the occupant's feet when the occupant sits on the seat section, and a lowered configuration for supporting the occupant's feet when the occupant sits on the seat section.

13. The support apparatus of claim 12, wherein the footrest comprises an elongate beam pivotably coupled to the base end portion via at least one hinge.

14. The support apparatus of claim 12, wherein the footrest is pivotably coupled to the base end portion via at least one hinge operatively coupled to an actuator, wherein the actuator is configured to reconfigure the footrest between the raised configuration and the lowered configuration.

15. The support apparatus of claim 12, wherein the support apparatus is reconfigurable between a chair configuration and a bed configuration, wherein the back section is oriented at an angle relative to the seat section when in the chair configuration.

16. The support apparatus of claim 12, wherein the back section has a narrowed lower portion configured to be straddled by a user.

17. The support apparatus of claim 12, wherein the footrest is configured to support a user's feet when the user faces toward and straddles the back section and when the user faces away from the back section.

18. The support apparatus of claim 12, wherein the footrest is spring-loaded to bias toward a locked configuration.

19. The support apparatus of claim 12, wherein the footrest is translatable along a longitudinal axis of the footrest for unlocking and locking.

20. The support apparatus of claim 12, wherein the footrest includes independently rotatable left and right footrests.

21. A support apparatus, comprising:

a seat section;

a straddable back assembly pivotably coupled to the seat section and including a split headrest reconfigurable between a chin-support configuration and a head-support configuration, wherein the split headrest defines a head-receiving opening when the split headrest is in a head support configuration, and wherein the split headrest has a chin-receiving channel that becomes accessible when the split headrest is moved to a chin support configuration.

22. The support apparatus of claim 21, wherein the split headrest is movable between an open configuration for the chin support configuration and a closed configuration for the head support configuration.

23. The support apparatus of claim 21, wherein a rear side of a back portion of the straddable back assembly interfaces a rear side of a rotatable head-support portion of the split headrest when the split headrest is the chin support configuration.

24. The support apparatus of claim 21, wherein the split headrest has one or more rods slidably retained by a backrest of the straddable back assembly.

25. The support apparatus of claim 21, further comprising one or more embedded magnets for holding the split headrest in the chin-support configuration and/or the head-support configuration.

26. The support apparatus of claim 21, further comprising a lockable hinge configured to allow a user to move the split headrest between the chin-support configuration and the head-support configuration.

27. The support apparatus of claim 21, further comprising:

a base rotatably coupled to a lower side of the seat section; and a footrest pivotably coupled to the base and movable between a plurality of heights.

28. The support apparatus of claim 21, wherein the straddable back assembly includes a back section defining leg openings, and at least one hinge rotatably coupling the split headrest to the back section.

29. The support apparatus of claim 21, wherein the straddable back assembly includes a back section defining leg openings, wherein the split headrest is detachably coupled to the back section.

30. The support apparatus of claim 21, wherein the split headrest has a generally continuous cushioned edge portion surrounding the head-receiving opening when the split headrest is in the head support configuration.

31. The support apparatus of claim 21, wherein the split headrest includes two U-shaped portions pivotally coupled together.

32. A support apparatus, comprising:

a seat assembly configured to support an occupant and including a seat section, a pair of padded leg sections rotatably relative to the seat section and configured to support an occupant's lower legs when the occupant sits on the seat section, and a back section coupled to the seat section; and a base assembly coupled to the seat assembly and including a base holding the seat assembly and configured to rest on a flat surface, and an adjustable footrest rotatably coupled to the base and spaced apart from the seat section and the pair of padded leg sections, wherein the footrest is movable relative to the base between a raised configuration for supporting the occupant's feet when the occupant sits on the seat section, and a lowered configuration for supporting the occupant's feet when the occupant sits on the seat section.

33. The support apparatus of claim 32, wherein the base is rotatably coupled to a lower side of the seat section, and the pivotably is coupled to the base and movable between a plurality of heights.

* * * * *